United States Patent
Khoshnevisan et al.

(10) Patent No.: US 12,452,878 B2
(45) Date of Patent: Oct. 21, 2025

(54) SEMIPERSISTENT REPORTING OF CHANNEL STATE INFORMATION

(71) Applicant: QUALCOMM Incorporated, San Diego, CA (US)

(72) Inventors: Mostafa Khoshnevisan, San Diego, CA (US); Yitao Chen, San Marcos, CA (US); Jing Sun, San Diego, CA (US); Xiaoxia Zhang, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 18/467,885

(22) Filed: Sep. 15, 2023

(65) Prior Publication Data
US 2024/0080851 A1 Mar. 7, 2024

Related U.S. Application Data

(63) Continuation of application No. 17/538,851, filed on Nov. 30, 2021, now Pat. No. 11,792,818.
(Continued)

(51) Int. Cl.
*H04W 72/23* (2023.01)
*H04B 7/06* (2006.01)
*H04L 5/00* (2006.01)

(52) U.S. Cl.
CPC .......... *H04W 72/23* (2023.01); *H04B 7/0626* (2013.01); *H04L 5/0048* (2013.01); *H04L 5/0053* (2013.01)

(58) Field of Classification Search
CPC .... H04W 72/23; H04B 7/0626; H04L 5/0048; H04L 5/0053; H04I 5/0053
See application file for complete search history.

(56) References Cited

U.S. PATENT DOCUMENTS

| 10,015,691 B2 | 7/2018 | Damnjanovic et al. |
| 2017/0013641 A1 | 1/2017 | Patel et al. |

(Continued)

FOREIGN PATENT DOCUMENTS

| CN | 109417453 A | 3/2019 |
| CN | 110521137 A | 11/2019 |

(Continued)

OTHER PUBLICATIONS

Ericsson: "Remaining Issue of PUSCH Enhancements for NR URLLC", 3GPP Draft, 3GPP TSG-RAN WG1 Meeting #100bis, R1-2001786, 3rd Generation Partnership Project (3GPP), Mobile Competence Centre, 650, Route Des Lucioles, F-06921 Sophia-Antipolis Cedex, France, vol. RAN WG1, No. Online Meeting, Apr. 20, 2020-Apr. 30, 2020, Apr. 11, 2020 (Apr. 11, 2020), XP051875274, 12 Pages, Retrieved from the Internet: URL: https://ftp.3gpp.org/tsg_ran/WG1_RL1/TSGR1_100b_e/Docs/R1-2001786.zip title="Link: https://ftp.3gpp.org/tsg_ran/WG1_RL1/TSGR1_100b_e/Docs/R1-2001786.zip">https://ftp.3gpp.org/tsg_ran/WG1_RL1/TSGR1_100b_e/Docs/R1-2001786.zip R1-2001786 Remaining Issue of PUSCH Enhancements for NR URLLC.docx [Retrieved on Apr. 11, 2020] Section 2.2, pp. 4, 5.

(Continued)

*Primary Examiner* — Ronald B Abelson
(74) *Attorney, Agent, or Firm* — Holland & Hart LLP

(57) ABSTRACT

Methods, systems, and devices for wireless communications are described. In some wireless communications systems, a user equipment (UE) may receive, from a base station, downlink control information (DCI) that activates periodic channel state information (CSI) reporting via uplink shared channel transmissions (e.g., via physical uplink shared channel (PUSCH) transmissions). The UE may then identify a trigger condition that triggers a transmission of both a first instance of a CSI report and a second instance of the CSI (Continued)

report within a period of the periodic CSI reporting. Based on the satisfaction of the trigger condition, the UE may transmit the first instance of the CSI report via a first uplink shared channel transmission and the second instance of the CSI report via a second uplink shared channel transmission, where both uplink channel transmissions are within the period of the periodic CSI reporting.

18 Claims, 19 Drawing Sheets

Related U.S. Application Data

(60) Provisional application No. 63/131,287, filed on Dec. 28, 2020.

(56) References Cited

U.S. PATENT DOCUMENTS

| | | |
|---|---|---|
| 2017/0366377 A1 | 12/2017 | Papasakellariou |
| 2018/0287757 A1 | 10/2018 | Onggosanusi |
| 2019/0141677 A1 | 5/2019 | Harrison et al. |
| 2019/0150172 A1 | 5/2019 | Ang et al. |
| 2019/0174466 A1* | 6/2019 | Zhang ................. H04L 5/0057 |
| 2020/0112419 A1* | 4/2020 | Bagheri ............... H04L 5/0057 |
| 2022/0210813 A1 | 6/2022 | Khoshnevisan et al. |
| 2023/0019570 A1* | 1/2023 | Guo ................. H04W 72/1268 |
| 2023/0412238 A1* | 12/2023 | Tran ..................... H04W 16/28 |

FOREIGN PATENT DOCUMENTS

| | | |
|---|---|---|
| CN | 110663214 A | 1/2020 |
| CN | 110771073 A | 2/2020 |
| EP | 3596863 A1 | 1/2020 |
| WO | WO-2016061382 | 4/2016 |
| WO | WO-2019136205 A1 | 7/2019 |
| WO | WO-2020170449 A1 | 8/2020 |

OTHER PUBLICATIONS

International Search Report and Written Opinion—PCT/US2021/072660—ISA/EPO—Jun. 20, 2022.
Partial International Search Report—PCT/US2021/072660—ISA/EPO—Mar. 29, 2022.
Qualcomm Incorporated: "Maintenance for CSI Reporting", 3GPP Draft, 3GPP TSG RAN WG1 Meeting #92bis, R1-1804786, 3rd Generation Partnership Project (3GPP), Mobile Competence Centre, 650, Route Des Lucioles, F-06921 Sophia-Antipolis Cedex, France, vol. Ran WG1, No. Sanya, China, Apr. 16, 2018-Apr. 20, 2018, Apr. 15, 2018 (Apr. 15, 2018), XP051427053, pp. 1-15, p. 9.11, figure 4.

* cited by examiner

SEMIPERSISTENT REPORTING OF CHANNEL STATE INFORMATION

CROSS REFERENCE

The present Application for Patent is a Continuation of U.S. patent application Ser. No. 17/538,851 by KHOSHNEVISAN, et al., entitled "SEMIPERSISTENT REPORTING OF CHANNEL STATE INFORMATION", filed Nov. 30, 2021, which claims the benefit of U.S. Provisional Patent Application No. 63/131,287 by KHOSHNEVISAN et al., entitled "SEMIPERSISTENT REPORTING OF CHANNEL STATE INFORMATION," filed Dec. 28, 2020, assigned to the assignee hereof, and expressly incorporated by reference herein.

FIELD OF TECHNOLOGY

The following relates to wireless communications, including semipersistent reporting of channel state information.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform spread orthogonal frequency division multiplexing (DFT-S-OFDM). A wireless multiple-access communications system may include one or more base stations or one or more network access nodes, each simultaneously supporting communication for multiple communication devices, which may be otherwise known as user equipment (UE).

Some wireless communications systems may support communications using one or multiple antenna arrays at different devices. For instance, a network may communicate with a UE using one or more transmission/reception points (TRPs), where each TRP and the UE may have one or more antenna arrays to form directional beams. Efficient communications between UEs and one or multiple TRPs may help to enhance network throughput, latency, and reliability, and thus techniques to further improve efficient communications are desirable.

SUMMARY

The described techniques relate to improved methods, systems, devices, and apparatuses that support semipersistent reporting of channel state information. Various aspects provide techniques for communications between a user equipment (UE) and a base station in which the UE may transmit multiple repetitions of an uplink communication by different transmission beams to enhance the likelihood of successful receipt of the uplink communication. For example, the base station may transmit signaling activating periodic channel state information (CSI) reporting and the UE may identify a trigger condition that triggers both a first instance of a CSI report and a second instance of the CSI report within a period of the periodic CSI reporting. The UE may then transmit a first instance of the CSI report via a first uplink shared channel transmission (e.g., via a first physical uplink shared channel (PUSCH) transmission) and the second instance of the CSI report via a second uplink shared channel transmission (e.g., via a second PUSCH transmission) during a single period of the periodic CSI reporting. By transmitting multiple instances of a CSI report, a reliability of the CSI report may be higher when compared to a single instance of CSI report transmissions. Additionally, the UE may transmit the first and second instances of the CSI report using different sounding reference signal (SRS) resource sets (e.g., each associated with a different transmission beam). Here, transmitting multiple instances of a CSI report by both the first SRS resource set and the second SRS resource set may further improve a reliability of the CSI report when compared to CSI reports that utilize a single SRS resource set.

A method for wireless communication at a UE is described. The method may include receiving, from a base station, downlink control information (DCI) that activates periodic CSI reporting via uplink shared channel transmissions, identifying a trigger condition that triggers transmission of both a first instance of a CSI report and a second instance of the CSI report within a period of the periodic CSI reporting, and transmitting, based on satisfaction of the trigger condition, the first instance of the CSI report via a first uplink shared channel transmission and the second instance of the CSI report via a second uplink shared channel transmission, the first uplink shared channel transmission and the second uplink shared channel transmission both being within the period of the periodic CSI reporting.

An apparatus for wireless communication at a UE is described. The apparatus may include a processor, memory in electronic communication with the processor, and instructions stored in the memory. The instructions may be executable by the processor to cause the apparatus to receive, from a base station, DCI that activates periodic CSI reporting via uplink shared channel transmissions, identify a trigger condition that triggers transmission of both a first instance of a CSI report and a second instance of the CSI report within a period of the periodic CSI reporting, and transmit, based on satisfaction of the trigger condition, the first instance of the CSI report via a first uplink shared channel transmission and the second instance of the CSI report via a second uplink shared channel transmission, the first uplink shared channel transmission and the second uplink shared channel transmission both being within the period of the periodic CSI reporting.

Another apparatus for wireless communication at a UE is described. The apparatus may include means for receiving, from a base station, DCI that activates periodic CSI reporting via uplink shared channel transmissions, means for identifying a trigger condition that triggers transmission of both a first instance of a CSI report and a second instance of the CSI report within a period of the periodic CSI reporting, and means for transmitting, based on satisfaction of the trigger condition, the first instance of the CSI report via a first uplink shared channel transmission and the second instance of the CSI report via a second uplink shared channel transmission, the first uplink shared channel transmission and the second uplink shared channel transmission both being within the period of the periodic CSI reporting.

A non-transitory computer-readable medium storing code for wireless communication at a UE is described. The code may include instructions executable by a processor to receive, from a base station, DCI that activates periodic CSI reporting via uplink shared channel transmissions, identify a trigger condition that triggers transmission of both a first instance of a CSI report and a second instance of the CSI report within a period of the periodic CSI reporting, and transmit, based on satisfaction of the trigger condition, the first instance of the CSI report via a first uplink shared channel transmission and the second instance of the CSI report via a second uplink shared channel transmission, the first uplink shared channel transmission and the second uplink shared channel transmission both being within the period of the periodic CSI reporting.

Some examples of the method, apparatuses, and non-transitory computer-readable medium described herein may further include operations, features, means, or instructions for determining that the trigger condition may be satisfied based on the DCI indicating both a first SRS resource set associated with the first uplink shared channel transmission and a second SRS resource set associated with the second uplink shared channel transmission.

In some examples of the method, apparatuses, and non-transitory computer-readable medium described herein, the transmitting may include operations, features, means, or instructions for transmitting the first instance of the CSI report via the first uplink shared channel transmission using a first transmission beam associated with the first SRS resource set and transmitting the second instance of the CSI report via the second uplink shared channel transmission using a second transmission beam associated with the second SRS resource set.

Some examples of the method, apparatuses, and non-transitory computer-readable medium described herein may further include operations, features, means, or instructions for determining that the trigger condition may be satisfied based on the DCI indicating more than one repetition of uplink shared channel transmissions within the period of the periodic CSI reporting.

Some examples of the method, apparatuses, and non-transitory computer-readable medium described herein may further include operations, features, means, or instructions for receiving, from the base station, radio resource control (RRC) signaling indicating a set of multiple trigger states each associated with a CSI reporting configuration, where the DCI activates the periodic CSI reporting by indicating one trigger state from the set of multiple trigger states.

Some examples of the method, apparatuses, and non-transitory computer-readable medium described herein may further include operations, features, means, or instructions for determining that the trigger condition may be satisfied based on the one trigger state being associated with a CSI reporting configuration that indicates the transmission of both the first instance of the CSI report and the second instance of the CSI report within the period of the periodic CSI reporting.

Some examples of the method, apparatuses, and non-transitory computer-readable medium described herein may further include operations, features, means, or instructions for determining that the trigger condition may be satisfied based on a value of a field within the DCI that may be configured to indicate either the transmission of both the first instance of the CSI report and the second instance of the CSI report within the period of the periodic CSI reporting or a transmission of a single CSI report within the period of the periodic CSI reporting.

Some examples of the method, apparatuses, and non-transitory computer-readable medium described herein may further include operations, features, means, or instructions for determining to transmit two repetitions of a PUSCH transmission within each period of the periodic CSI reporting based on the satisfaction of the trigger condition, the two repetitions including the first uplink shared channel transmission and the second uplink shared channel transmission.

In some examples of the method, apparatuses, and non-transitory computer-readable medium described herein, a configured quantity of repetitions of the PUSCH transmission within each period of the periodic CSI reporting may be one or greater than two.

Some examples of the method, apparatuses, and non-transitory computer-readable medium described herein may further include operations, features, means, or instructions for determining, after the period of the periodic CSI reporting, a second CSI report to transmit during a second period of the periodic CSI reporting via a third PUSCH transmission and a fourth PUSCH transmission, identifying that an actual transmission of one PUSCH transmission from the third PUSCH transmission or the fourth PUSCH transmission may be different from a nominal transmission of the one PUSCH transmission, and refraining from transmitting the one PUSCH transmission during the second period of the periodic CSI reporting based on identifying that the actual transmission may be different from the nominal transmission.

Some examples of the method, apparatuses, and non-transitory computer-readable medium described herein may further include operations, features, means, or instructions for transmitting, within the second period of the periodic CSI reporting, an other PUSCH transmission from the third PUSCH transmission and the fourth PUSCH transmission including the second CSI report based on an actual transmission of the other PUSCH transmission being the same as a nominal transmission of the other PUSCH transmission.

Some examples of the method, apparatuses, and non-transitory computer-readable medium described herein may further include operations, features, means, or instructions for refraining from transmitting an other PUSCH transmission from the third PUSCH transmission and the fourth PUSCH transmission based on an actual transmission of the other PUSCH transmission being the different from the nominal transmission of the other PUSCH transmission.

In some examples of the method, apparatuses, and non-transitory computer-readable medium described herein, the DCI activates the periodic CSI reporting based on indicating a trigger state associated with a CSI reporting configuration indicating a first transmission power and a second transmission power, where transmitting the first instance of the CSI report and the second instance of the CSI report may be based on at least one of the first transmission power or the second transmission power.

In some examples of the method, apparatuses, and non-transitory computer-readable medium described herein, the transmitting may include operations, features, means, or instructions for transmitting, according to the first transmission power, the first instance of the CSI report via the first uplink shared channel transmission using a first SRS resource set indicated by the DCI and transmitting, according to the second transmission power, the second instance of the CSI report via the second uplink shared channel transmission using a second SRS resource set indicated by the DCI.

In some examples of the method, apparatuses, and non-transitory computer-readable medium described herein, the transmitting may include operations, features, means, or instructions for transmitting both the first instance of the CSI report and the second instance of the CSI report according to the first transmission power based on the DCI indicating a single SRS resource set, where both the first uplink shared channel transmission and the second uplink shared channel transmission use the single SRS resource set.

A method for wireless communication at a base station is described. The method may include transmitting, to a UE, DCI that activates periodic CSI reporting via uplink shared channel transmissions, indicating a trigger condition that triggers the UE to transmit both a first instance of a CSI report and a second instance of the CSI report within a period of the periodic CSI reporting, and receiving, based on satisfaction of the trigger condition, the first instance of the CSI report via a first uplink shared channel transmission and the second instance of the CSI report via a second uplink shared channel transmission, the first uplink shared channel transmission and the second uplink shared channel transmission both being within the period of the periodic CSI reporting.

An apparatus for wireless communication at a base station is described. The apparatus may include a processor, memory in electronic communication with the processor, and instructions stored in the memory. The instructions may be executable by the processor to cause the apparatus to transmit, to a UE, DCI that activates periodic CSI reporting via uplink shared channel transmissions, indicate a trigger condition that triggers the UE to transmit both a first instance of a CSI report and a second instance of the CSI report within a period of the periodic CSI reporting, and receive, based on satisfaction of the trigger condition, the first instance of the CSI report via a first uplink shared channel transmission and the second instance of the CSI report via a second uplink shared channel transmission, the first uplink shared channel transmission and the second uplink shared channel transmission both being within the period of the periodic CSI reporting.

Another apparatus for wireless communication at a base station is described. The apparatus may include means for transmitting, to a UE, DCI that activates periodic CSI reporting via uplink shared channel transmissions, means for indicating a trigger condition that triggers the UE to transmit both a first instance of a CSI report and a second instance of the CSI report within a period of the periodic CSI reporting, and means for receiving, based on satisfaction of the trigger condition, the first instance of the CSI report via a first uplink shared channel transmission and the second instance of the CSI report via a second uplink shared channel transmission, the first uplink shared channel transmission and the second uplink shared channel transmission both being within the period of the periodic CSI reporting.

A non-transitory computer-readable medium storing code for wireless communication at a base station is described. The code may include instructions executable by a processor to transmit, to a UE, DCI that activates periodic CSI reporting via uplink shared channel transmissions, indicate a trigger condition that triggers the UE to transmit both a first instance of a CSI report and a second instance of the CSI report within a period of the periodic CSI reporting, and receive, based on satisfaction of the trigger condition, the first instance of the CSI report via a first uplink shared channel transmission and the second instance of the CSI report via a second uplink shared channel transmission, the first uplink shared channel transmission and the second uplink shared channel transmission both being within the period of the periodic CSI reporting.

In some examples of the method, apparatuses, and non-transitory computer-readable medium described herein, the trigger condition may be satisfied based on the DCI indicating both a first SRS resource set associated with the first uplink shared channel transmission and a second SRS resource set associated with the second uplink shared channel transmission.

In some examples of the method, apparatuses, and non-transitory computer-readable medium described herein, the first instance of the CSI report received via the first uplink shared channel transmission may be associated with a first transmission beam corresponding to the first SRS resource set and the second instance of the CSI report received via the second uplink shared channel transmission may be associated with a second transmission beam corresponding to the second SRS resource set.

In some examples of the method, apparatuses, and non-transitory computer-readable medium described herein, the trigger condition may be satisfied based on the DCI indicating more than one repetition of uplink shared channel transmissions within the period of the periodic CSI reporting.

Some examples of the method, apparatuses, and non-transitory computer-readable medium described herein may further include operations, features, means, or instructions for transmitting, to the UE, RRC signaling indicating a set of multiple trigger states each associated with a CSI reporting configuration, where the DCI activates the periodic CSI reporting by indicating one trigger state from the set of multiple trigger states.

In some examples of the method, apparatuses, and non-transitory computer-readable medium described herein, the trigger condition may be satisfied based on the one trigger state being associated with a CSI reporting configuration that indicates for the UE to transmit both the first instance of the CSI report and the second instance of the CSI report within the period of the periodic CSI reporting.

In some examples of the method, apparatuses, and non-transitory computer-readable medium described herein, the trigger condition may be satisfied based on a value of a field within the DCI that may be configured to indicate either for the UE to transmit both the first instance of the CSI report and the second instance of the CSI report within the period of the periodic CSI reporting or for the UE to transmit a single CSI report within the period of the periodic CSI reporting.

In some examples of the method, apparatuses, and non-transitory computer-readable medium described herein, the DCI activates the periodic CSI reporting based on indicating a trigger state associated with a CSI reporting configuration indicating a first transmission power and a second transmission power, where receiving the first instance of the CSI report and the second instance of the CSI report may be based on at least one of the first transmission power or the second transmission power.

In some examples of the method, apparatuses, and non-transitory computer-readable medium described herein, the receiving may include operations, features, means, or instructions for receiving the first instance of the CSI report via the first uplink shared channel transmission having the first transmission power and associated with a first SRS resource set indicated by the DCI and receiving the second instance of the CSI report via the second uplink shared channel transmission having the second transmission power and associated with a second SRS resource set indicated by the DCI.

In some examples of the method, apparatuses, and non-transitory computer-readable medium described herein, the receiving may include operations, features, means, or instructions for receiving both the first uplink shared channel transmission and the second uplink shared channel transmission using a single SRS resource set based on the DCI indicating the single SRS resource set, where both the first uplink shared channel transmission and the second uplink shared channel transmission may have the first transmission power.

DETAILED DESCRIPTION

In some wireless communications systems, a user equipment (UE) may communicate with a base station using multiple repetitions of an uplink communication (in some cases by different transmission beams) to enhance the likelihood of successful receipt of the uplink communication. For example, the base station may transmit signaling activating periodic channel state information (CSI) reporting and the UE may identify a trigger condition that triggers both a first instance of a CSI report and a second instance of the CSI report within a period of the periodic CSI reporting. The UE may then transmit a first instance of the CSI report via a first uplink shared channel transmission (e.g., via a first physical uplink shared channel (PUSCH) transmission) and the second instance of the CSI report via a second uplink shared channel transmission (e.g., via a second PUSCH transmission) during a single period of the periodic CSI reporting. By transmitting multiple instances of a CSI report, a reliability of the CSI report may be higher when compared to a single instance of CSI report transmissions. Additionally, the UE may transmit the first and second instances of the CSI report using different SRS resource sets (e.g., each associated with a different transmission beam). Here, transmitting multiple instances of a CSI report by both the first SRS resource set and the second SRS resource set may further improve a reliability of the CSI report when compared to CSI reports that utilize a single SRS resource set.

Aspects of the disclosure are initially described in the context of wireless communications systems. Aspects of the disclosure are then described in the context of PUSCH transmission configurations and a process flow. Aspects of the disclosure are further illustrated by and described with reference to apparatus diagrams, system diagrams, and flowcharts that relate to semipersistent reporting of channel state information.

Figure 1:
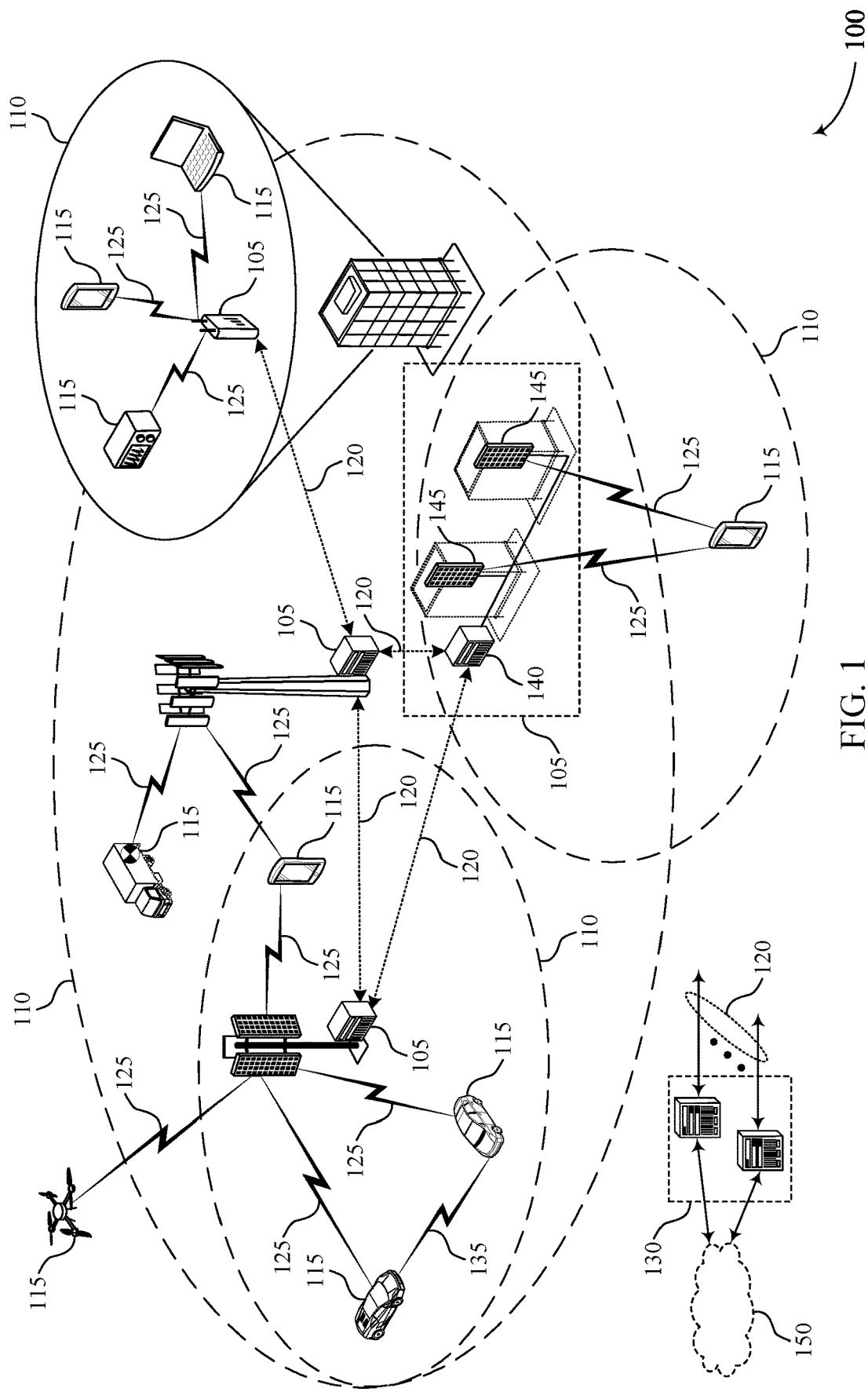
FIG. 1 illustrates an example of a wireless communications system that supports semipersistent reporting of channel state information (CSI) in accordance with aspects of the present disclosure.

FIG. 1 illustrates an example of a wireless communications system 100 that supports semipersistent reporting of CSI in accordance with aspects of the present disclosure. The wireless communications system 100 may include one or more base stations 105, one or more UEs 115, and a core network 130. In some examples, the wireless communications system 100 may be a Long Term Evolution (LTE) network, an LTE-Advanced (LTE-A) network, an LTE-A Pro network, or a New Radio (NR) network. In some examples, the wireless communications system 100 may support enhanced broadband communications, ultra-reliable (e.g., mission critical) communications, low latency communications, communications with low-cost and low-complexity devices, or any combination thereof.

The base stations 105 may be dispersed throughout a geographic area to form the wireless communications system 100 and may be devices in different forms or having different capabilities. The base stations 105 and the UEs 115 may wirelessly communicate via one or more communication links 125. Each base station 105 may provide a coverage area 110 over which the UEs 115 and the base station 105 may establish one or more communication links 125. The coverage area 110 may be an example of a geographic area over which a base station 105 and a UE 115 may support the communication of signals according to one or more radio access technologies.

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115, the base stations 105, or network equipment (e.g., core network nodes, relay devices, integrated access and backhaul (IAB) nodes, or other network equipment), as shown in FIG. 1.

The base stations 105 may communicate with the core network 130, or with one another, or both. For example, the base stations 105 may interface with the core network 130 through one or more backhaul links 120 (e.g., via an S1, N2, N3, or other interface). The base stations 105 may communicate with one another over the backhaul links 120 (e.g., via an X2, Xn, or other interface) either directly (e.g., directly between base stations 105), or indirectly (e.g., via core network 130), or both. In some examples, the backhaul links 120 may be or include one or more wireless links.

One or more of the base stations 105 described herein may include or may be referred to by a person having ordinary skill in the art as a base transceiver station, a radio base station, an access point, a radio transceiver, a NodeB, an eNodeB (eNB), a next-generation NodeB or a giga-NodeB (either of which may be referred to as a gNB), a Home NodeB, a Home eNodeB, or other suitable terminology.

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the base stations 105 and the network equipment including macro eNBs or gNBs, small cell eNBs or gNBs, or relay base stations, among other examples, as shown in FIG. 1.

The UEs 115 and the base stations 105 may wirelessly communicate with one another via one or more communication links 125 over one or more carriers. The term "carrier" may refer to a set of radio frequency spectrum resources having a defined physical layer structure for supporting the communication links 125. For example, a carrier used for a communication link 125 may include a portion of a radio frequency spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme, the coding rate of the modulation scheme, or both). Thus, the more resource elements that a UE 115 receives and the higher the order of the modulation scheme, the higher the data rate may be for the UE 115. A wireless communications resource may refer to a combination of a radio frequency spectrum resource, a time resource, and a spatial resource (e.g., spatial layers or beams), and the use of multiple spatial layers may further increase the data rate or data integrity for communications with a UE 115.

The time intervals for the base stations 105 or the UEs 115 may be expressed in multiples of a basic time unit which may, for example, refer to a sampling period of $T_s=1/(\Delta f_{max} \cdot N_f)$ seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a number of slots. Alternatively, each frame may include a variable number of slots, and the number of slots may depend on subcarrier spacing. Each slot may include a number of symbol periods (e.g., depending on the length of the cyclic prefix prepended to each symbol period). In some wireless communications systems 100, a slot may further be divided into multiple mini-slots containing one or more symbols. Excluding the cyclic prefix, each symbol period may contain one or more (e.g., N f) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., the number of symbol periods in a TTI) may be variable. Additionally or alternatively, the smallest scheduling unit of the wireless communications system 100 may be dynamically selected (e.g., in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a number of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to a number of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

In some examples, a base station 105 may be movable and therefore provide communication coverage for a moving geographic coverage area 110. In some examples, different geographic coverage areas 110 associated with different technologies may overlap, but the different geographic coverage areas 110 may be supported by the same base station 105. In other examples, the overlapping geographic coverage areas 110 associated with different technologies may be supported by different base stations 105. The wireless communications system 100 may include, for example, a heterogeneous network in which different types of the base stations 105 provide coverage for various geographic coverage areas 110 using the same or different radio access technologies.

The wireless communications system 100 may support synchronous or asynchronous operation. For synchronous operation, the base stations 105 may have similar frame timings, and transmissions from different base stations 105 may be approximately aligned in time. For asynchronous operation, the base stations 105 may have different frame timings, and transmissions from different base stations 105 may, in some examples, not be aligned in time. The techniques described herein may be used for either synchronous or asynchronous operations.

The wireless communications system 100 may be configured to support ultra-reliable communications or low-latency communications, or various combinations thereof. For example, the wireless communications system 100 may be configured to support ultra-reliable low-latency communications (URLLC) or mission critical communications. The UEs 115 may be designed to support ultra-reliable, low-latency, or critical functions (e.g., mission critical functions). Ultra-reliable communications may include private communication or group communication and may be supported by one or more mission critical services such as mission critical push-to-talk (MCPTT), mission critical video (MCVideo), or mission critical data (MCData). Support for mission critical functions may include prioritization of services, and mission critical services may be used for public safety or general commercial applications. The terms ultra-reliable, low-latency, mission critical, and ultra-reliable low-latency may be used interchangeably herein.

In some examples, a UE 115 may also be able to communicate directly with other UEs 115 over a device-to-device (D2D) communication link 135 (e.g., using a peer-to-peer (P2P) or D2D protocol). One or more UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some examples, groups of the UEs 115 communicating via D2D communications may utilize a one-to-many (1:M) system in which each UE 115 transmits to every other UE 115 in the group. In some examples, a base station 105 facilitates the scheduling of resources for D2D communications. In other cases, D2D communications are carried out between the UEs 115 without the involvement of a base station 105.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the base stations 105 associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

Some of the network devices, such as a base station 105, may include subcomponents such as an access network entity 140, which may be an example of an access node controller (ANC). Each access network entity 140 may communicate with the UEs 115 through one or more other access network transmission entities 145, which may be referred to as radio heads, smart radio heads, or transmission/reception points (TRPs). Each access network transmission entity 145 may include one or more antenna panels. In some configurations, various functions of each access network entity 140 or base station 105 may be distributed across various network devices (e.g., radio heads and ANCs) or consolidated into a single network device (e.g., a base station 105).

The wireless communications system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to the UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communications system 100 may utilize both licensed and unlicensed radio frequency spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. When operating in unlicensed radio frequency spectrum bands, devices such as the base stations 105 and the UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

A base station 105 or a UE 115 may be equipped with multiple antennas, which may be used to employ techniques such as transmit diversity, receive diversity, multiple-input multiple-output (MIMO) communications, or beamforming. The antennas of a base station 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations. Additionally or alternatively, an antenna panel may support radio frequency beamforming for a signal transmitted via an antenna port.

The base stations 105 or the UEs 115 may use MIMO communications to exploit multipath signal propagation and increase the spectral efficiency by transmitting or receiving multiple signals via different spatial layers. Such techniques may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry bits associated with the same data stream (e.g., the same codeword) or different data streams (e.g., different codewords). Different spatial layers may be associated with different antenna ports used for channel measurement and reporting. MIMO techniques include single-user MIMO (SU-MIMO), where multiple spatial layers are transmitted to the same receiving device, and multiple-user MIMO (MU-MIMO), where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

A base station 105 or a UE 115 may use beam sweeping techniques as part of beam forming operations. For example, a base station 105 may use multiple antennas or antenna arrays (e.g., antenna panels) to conduct beamforming operations for directional communications with a UE 115. Some signals (e.g., synchronization signals, reference signals, beam selection signals, or other control signals) may be transmitted by a base station 105 multiple times in different directions. For example, the base station 105 may transmit a signal according to different beamforming weight sets associated with different directions of transmission. Transmissions in different beam directions may be used to identify (e.g., by a transmitting device, such as a base station 105, or by a receiving device, such as a UE 115) a beam direction for later transmission or reception by the base station 105.

Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based on a signal that was transmitted in one or more beam directions. For example, a UE 115 may receive one or more of the signals transmitted by the base station 105 in different directions and may report to the base station 105 an indication of the signal that the UE 115 received with a highest signal quality or an otherwise acceptable signal quality.

In some examples, transmissions by a device (e.g., by a base station 105 or a UE 115) may be performed using multiple beam directions, and the device may use a combination of digital precoding or radio frequency beamforming to generate a combined beam for transmission (e.g., from a base station 105 to a UE 115). The UE 115 may report feedback that indicates precoding weights for one or more beam directions, and the feedback may correspond to a configured number of beams across a system bandwidth or one or more sub-bands. The base station 105 may transmit a reference signal (e.g., a cell-specific reference signal (CRS), a CSI reference signal (CSI-RS)), which may be precoded or unprecoded. The UE 115 may provide feedback for beam selection, which may be a precoding matrix indicator (PMI) or codebook-based feedback (e.g., a multi-panel type codebook, a linear combination type codebook, a port selection type codebook). Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115) or for transmitting a signal in a single direction (e.g., for transmitting data to a receiving device).

A receiving device (e.g., a UE 115) may try multiple receive configurations (e.g., directional listening) when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets (e.g., different directional listening weight sets) applied to signals received at multiple antenna elements of an antenna array, or by processing received signals according to different receive beamforming weight sets applied to signals received at multiple antenna elements of an antenna array, any of which may be referred to as "listening" according to different receive configurations or receive directions. In some examples, a receiving device may use a single receive configuration to receive along a single beam direction (e.g., when receiving a data signal). The single receive configuration may be aligned in a beam direction determined based on listening according to different receive configuration directions (e.g., a beam direction determined to have a highest signal strength, highest signal-to-noise ratio (SNR), or otherwise acceptable signal quality based on listening according to multiple beam directions).

In some wireless communications systems 100, a UE 115 may communicate with a base station 105 using multiple repetitions of an uplink communication (in some cases by different transmission beams) to enhance the likelihood of successful receipt of the uplink communication. For example, the base station 105 may transmit signaling activating periodic CSI reporting and the UE 115 may identify a trigger condition that triggers both a first instance of a CSI report and a second instance of the CSI report within a period of the periodic CSI reporting. The UE 115 may then transmit a first instance of the CSI report via a first uplink shared channel transmission (e.g., via a first physical uplink shared channel (PUSCH) transmission) and the second instance of the CSI report via a second uplink shared channel transmission (e.g., via a second PUSCH transmission) during a single period of the periodic CSI reporting. By transmitting multiple instances of a CSI report, a reliability of the CSI report may be higher when compared to a single instance of CSI report transmissions. Additionally, the UE 115 may transmit the first and second instances of the CSI report using different SRS resource sets (e.g., each associated with a different transmission beam). Here, transmitting multiple instances of a CSI report by both the first SRS resource set and the second SRS resource set may further improve a reliability of the CSI report when compared to CSI reports that utilize a single SRS resource set.

Figure 2:
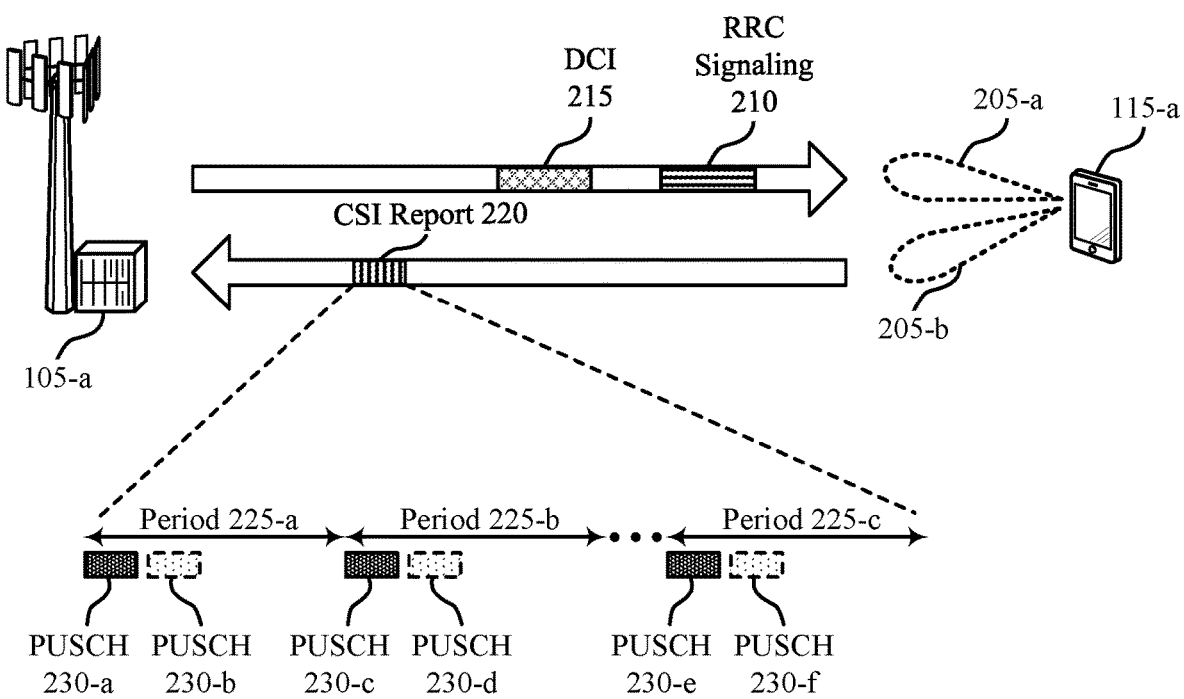
FIG. 2 illustrates an example of a wireless communications system that supports semipersistent reporting of CSI in accordance with aspects of the present disclosure.

FIG. 2 illustrates an example of a wireless communications system 200 that supports semipersistent reporting of CSI in accordance with aspects of the present disclosure. In some examples, the wireless communications system 200 may implement aspects of wireless communications system 100. For example, the wireless communications system 200 includes base station 105a and UE 115a, which may be examples of the respective devices as described with reference to FIG. 1. It is to be understood that references to specific wireless devices (e.g., UEs 115, TRPs, base stations 105) in the below figures are provided for illustrative purposes, and different wireless devices not specifically referred to herein may be used interchangeably with those described herein. Likewise, the described operations performed by UE 115-a may, in some cases, be performed by base station 105-a (or a TRP associated with the base station 105-a), and vice versa.

In some cases, the communications illustrated in wireless communications system 200 may be an example of the UE 115-a performing semipersistent reporting of CSI in response to downlink control information (DCI) 215 activating periodic CSI reporting via uplink shared channel transmissions (e.g., via PUSCH transmissions 230). Prior to transmitting the DCI 215, the base station 105-a may transmit radio resource control (RRC) signaling 210 indicating a set of trigger states (e.g., up to 64) each associated with a CSI reporting configuration that corresponds to unique CSI report settings. For example, the base station 105-a may transmit the RRC signaling 210 including a SemiPersistentOnPUSCH-TriggerStateList parameter. For example, each trigger state may indicate a period 225 for the periodic CSI reporting (e.g., based on a number of slots indicated by a reportSlotConfig parameter). Additionally, each trigger state may indicate a transmission power for transmitting the PUSCH transmissions 230 that carry the periodic CSI reports 220 (e.g., by indicating a P0, or offset, and alpha, or factor for partial power loss compensation).

In some cases, the RRC signaling 210 may additionally configure a type of PUSCH repetition for PUSCH transmissions 230. For example, the base station 105-a may indicate (e.g., via the RRC signaling 210) a type of PUSCH repetition where each repetition of PUSCH transmission is transmitted via a same set of slots within a symbol. For example, the base station 105-a may indicate for the UE 115-a to transmit each repetition of a PUSCH transmission via the fourth through the tenth slots within a quantity of symbols (e.g., that is the same as the quantity of PUSCH repetitions). In another example, the base station 105-a may indicate a type of PUSCH repetition where each PUSCH repetition is consecutive. For example, each PUSCH repetition may be transmitted by a consecutive set of symbols that cross a slot boundary. In this type of PUSCH repetition, the base station 105-a may indicate a quantity of nominal PUSCH repetition transmissions that may be different from a quantity of actual PUSCH repetitions transmissions. In one case, a nominal PUSCH repetition transmission may include symbols that cross a slot boundary. Here, the UE 115-a may transmit two actual PUSCH repetitions (e.g., each associated with the symbols associated with a single slot) corresponding to the single nominal PUSCH repetition. In another case, the UE 115-a may determine that one or more of the symbols associated with a nominal PUSCH repetition may be invalid (e.g., due to semi-static downlink symbols, based on an indication of the symbol being invalid, due to synchronization signal block (SSB) symbols, for symbols associated with a control resource set (CORESET) 0 for Type0-physical downlink control channel (PDCCH)). Here, the actual PUSCH repetition may include less symbols than the nominal PUSCH repetition.

After transmitting the RRC signaling 210, the base station 105-a may transmit DCI 215 that activates periodic CSI reporting via PUSCH transmissions. In some cases, the DCI 215 may indicate one of the trigger states configured by the RRC signaling 210. In some instances, the DCI 215 may be scrambled using semipersistent-channel state information-radio network temporary identifier (SP-CSI-RNTI).

Based on receiving the DCI 215, the UE 115-a may identify the single CSI reporting configuration associated with the indicated trigger state. The UE 115-a may additionally identify whether a trigger condition that triggers transmission of both a first instance of a CSI report 220 and a second instance of the CSI report 220 within a period 225 of the periodic CSI reporting is satisfied. If the UE 115-a determines that the trigger condition is satisfied, the UE 115-a may transmit, by a transmission beam 205, the first instance of the CSI report 220 via a first PUSCH transmission 230 and a second instance of the CSI report 220 via a second PUSCH transmission 230 within each period 225 of the periodic CSI reporting. For example, the UE 115-a may transmit a first instance of the CSI report 220 via the PUSCH transmission 230-a and a second instance of the CSI report 220 via the PUSCH transmission 230-b within the period 225-a. Alternatively, if the UE 115-a determines that the trigger condition is not satisfied, the UE 115-a may transmit, by a transmission beam 205, a single instance of the CSI report 220 within each period 225 of the periodic CSI reporting. That is, the UE 115-a may transmit CSI reports 220 via the PUSCH transmissions 230-a, 230-c, and 230-e, and may refrain from transmitting CSI reports via the PUSCH transmissions 230-b, 230-d, and 230-f.

In some cases when the UE 115-a determines that the trigger condition is satisfied, the DCI 215 may indicate two trigger states, each associated with a CSI reporting configuration. In some instances, the two CSI reporting configurations may each indicate differing transmission powers for transmitting the instances of the CSI report 220 (e.g., via different offset values, partial power loss compensation values, or both). In a first example, the UE 115-a may transmit the first instance of the CSI report 220 via a PUSCH transmission 230 using a transmission beam 205-a associated with a first sound reference signal (SRS) resource set. Additionally, the UE 115-a may transmit the second instance of the CSI report 220 via a PUSCH transmission 230 using a transmission beam 205-b associated with a second SRS resource set. Here, the UE 115-a may transmit the first instance of the CSI report 220 using a first transmission power (e.g., indicated by the first trigger state) and the second instance of the CSI report 220 using a second transmission power (e.g., indicated by the second trigger state). In a second example, the UE 115-*a* may transmit both instances of the CSI report 220 via PUSCH transmissions 230 using a same transmission beam 205 that is associated with a single SRS resource set. Here, the UE 115-*a* may transmit both instances of the CSI report 220 using a single transmission power (e.g., indicated by one of the trigger states).

In one example, the UE 115-*a* may determine that the trigger condition is satisfied based on the DCI 215 indicating a first SRS associated with the first PUSCH transmission 230 and a second SRS associated with the second PUSCH transmission 230. For example, the DCI 215 may indicate that PUSCH transmissions 230-*a*, 230-*c*, and 230-*e* are associated with one SRS resource set and PUSCH transmissions 230-*b*, 230-*d*, and 230-*f* are associated with another SRS resource set. The UE 115-*a* may then determine that the trigger condition is satisfied and may transmit two instances of the CSI report 220 within each period 225 using PUSCH transmissions 230 associated with different SRS resource sets. Here, the UE 115-*a* may transmit the PUSCH transmissions 230 within each period 225 using a different transmission beam 205. For example, the UE 115-*a* may transmit PUSCH transmissions 230 associated with a first SRS resource set using the transmission beam 205-*a*. Additionally, the UE 115-*a* may transmit PUSCH transmissions 230 associated with a second SRS resource set using the transmission beam 205-*b*.

In another example, the UE 115-*a* may determine that the trigger condition is satisfied based on the DCI 215 indicating more than one repetition of the PUSCH transmissions 230. In some cases, the DCI 215 may indicate more than two repetitions of the PUSCH transmissions 230 (e.g., within each period 225). Here, the UE 115-*a* may still transmit two PUSCH transmissions 230 within each period. Additionally or alternatively, the UE 115-*a* may determine that the trigger condition is satisfied based on the DCI 215 indicating a trigger state that is associated with a CSI reporting configuration indicating both the first and second instance of the CSI reports. That is, the RRC signaling 210 may additionally indicate, for each trigger state, whether that trigger state is associated with a single CSI reporting instance in each period 225 or two CSI reporting instances in each period 225. In another example, the UE 115-*a* may determine that the trigger condition is satisfied based on the DCI 215 including a field (e.g., a single bit within the DCI 215) indicating whether the activated trigger state is associated with a single CSI reporting instance in each period 225 or two CSI reporting instances in each period 225.

Figure 3A:
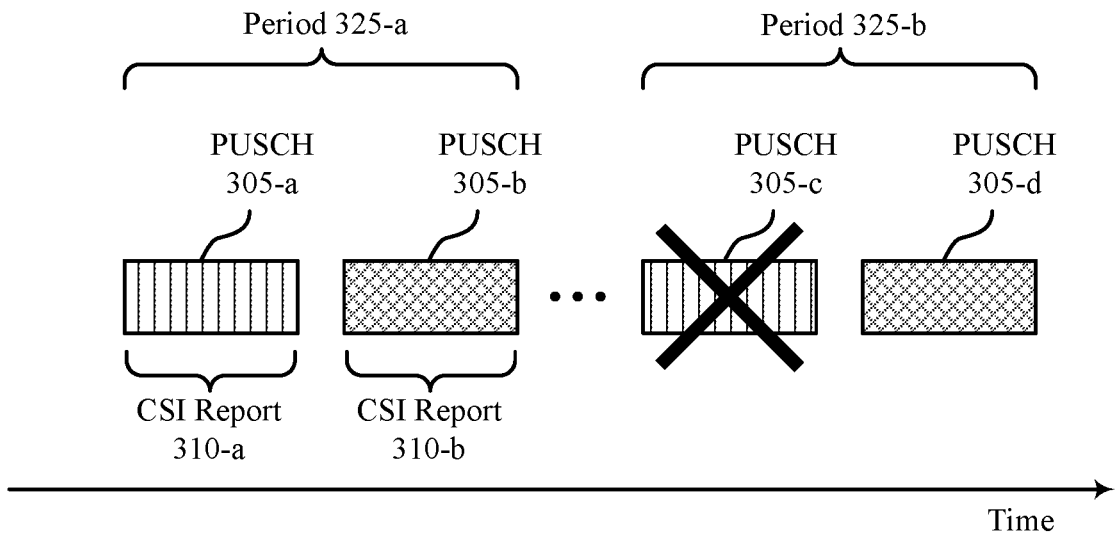
FIGS. 3A and 3B illustrate examples of PUSCH transmission configurations that support semipersistent reporting of CSI in accordance with aspects of the present disclosure.
Figure 3B:
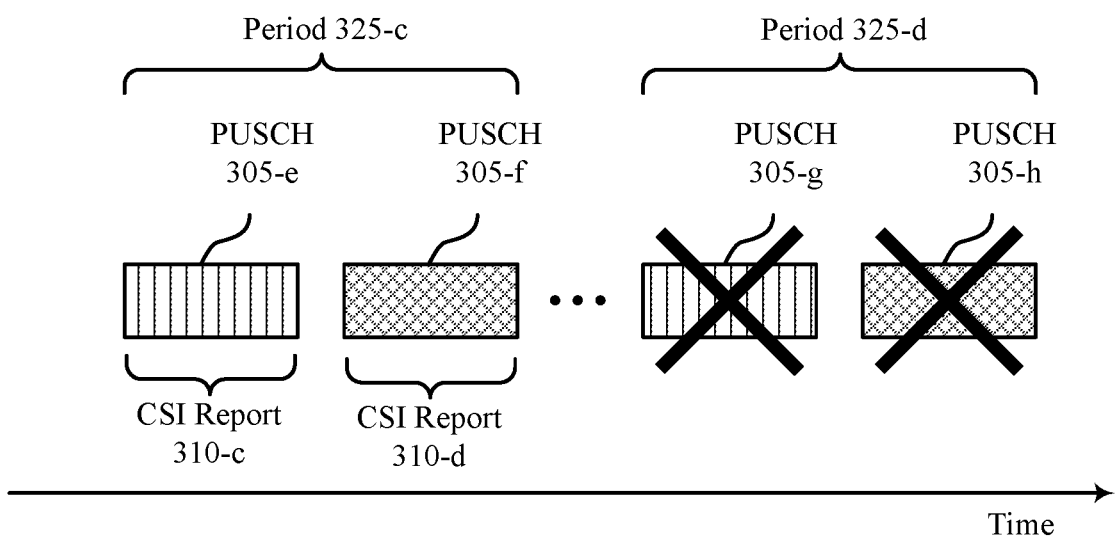

FIGS. 3A and 3B illustrate examples of PUSCH transmission configurations 300 that support semipersistent reporting of CSI in accordance with aspects of the present disclosure. For example, PUSCH transmission configurations 300 may illustrate example PUSCH transmission configurations 300 including two PUSCH transmissions 305 transmitted in each period 325 of the periodic CSI reporting. Additionally, each PUSCH transmission 305 may include an instance of a CSI report 310. In some examples, the PUSCH transmission configurations 300 may implement aspects of wireless communications as described with reference to FIGS. 1 and 2. For example, for both PUSCH transmission configurations 300, a base station may configure (e.g., by RRC signaling, by DCI) the semipersistent reporting of CSI including two instances of CSI reports 310 within each period 325 of the periodic CSI reporting as described with reference to FIGS. 1 and 2.

In the example of the PUSCH transmission configuration 300-*a*, the actual PUSCH transmissions 305-*a*, 305-*b*, and 305-*d* may be the same as the nominal PUSCH transmissions 305-*a*, 305-*b*, and 305-*d*. Additionally, the actual PUSCH transmission 305-*c* may be different from the nominal PUSCH transmission 305-*c*. For example, the UE may determine that one or more symbols associated with the PUSCH transmission 305-*c* are invalid. Here, the UE may refrain from transmitting the PUSCH transmission 305-*c* within the period 325-*b*. The UE may still transmit the PUSCH transmission 305-*d* within the period 325-*b* (e.g., even in the case that the actual transmission of the other PUSCH transmission 305-*c* within the period 325-*b* is different from the nominal transmission of the PUSCH transmission 305-*c*).

In the example of the PUSCH transmission configuration 300-*b*, the actual PUSCH transmissions 305-*e*, 305-*f*, and 305-*h* may be the same as the nominal PUSCH transmissions 305-*e*, 305-*f*, and 305-*h*. Additionally, the actual PUSCH transmission 305-*g* may be different from the nominal PUSCH transmission 305-*g*. For example, the UE may determine that one or more symbols associated with the PUSCH transmission 305-*g* are invalid. Here, the UE may refrain from transmitting the PUSCH transmission 305-*g* within the period 325-*d*. The UE may also refrain from transmitting the PUSCH transmission 305-*h* within the period 325-*d* even though the actual transmission of the PUSCH transmission 305-*h* and the nominal transmission of the PUSCH transmission 305-*h* are the same. That is, the UE may not transmit any PUSCH transmission 305 in a period 325 when either one of the actual PUSCH transmissions 305 is different from the nominal PUSCH transmission 305.

Figure 4:
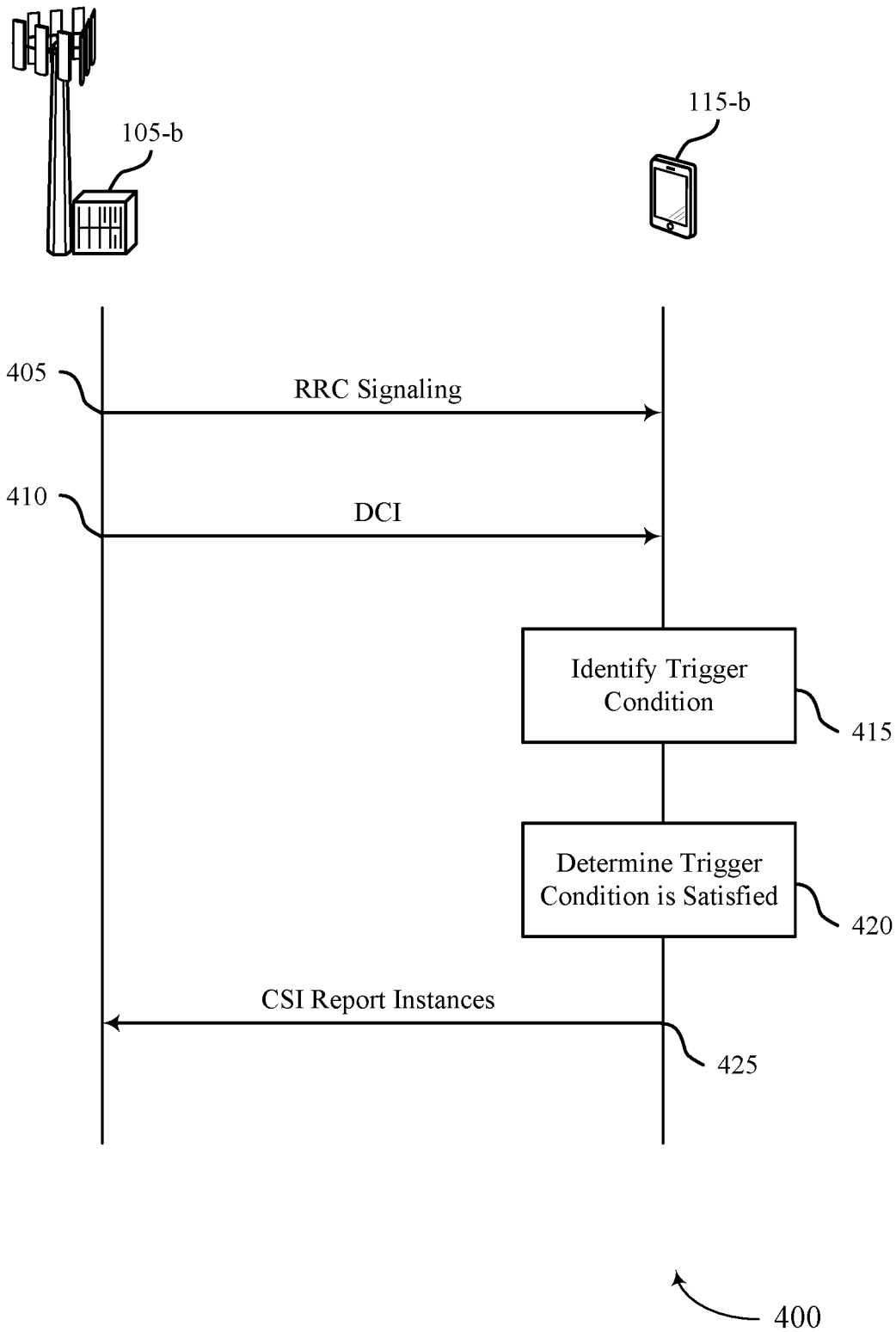
FIG. 4 illustrates an example of a process flow that supports semipersistent reporting of CSI in accordance with aspects of the present disclosure.

FIG. 4 illustrates an example of a process flow 400 that supports semipersistent reporting of CSI in accordance with aspects of the present disclosure. In some examples, the process flow 400 may implement aspects of FIGS. 1 through 3. For example, the UE 115-*b* may be an example of the UEs 115 as described with respect to FIGS. 1 through 3. Additionally, the base station 105-*b* may be an example of the base stations 105 as described with respect to FIGS. 1 through 3.

At 405, the base station 105-*b* may transmit RRC signaling to the UE 115-*b*. For example, the UE 115-*b* may receive RRC signaling indicating a set of trigger states each associated with a CSI reporting configuration.

At 410, the base station 105-*b* may transmit DCI to the UE 115-*b*. For example, the UE 115-*b* may receive the DCI that activates periodic CSI reporting via uplink shared channel transmissions. In some cases, the DCI may activate the periodic CSI reporting by indicating one trigger state from the set of trigger states.

At 415, the UE 115-*b* may identify a trigger condition that triggers transmission of both a first instance of a CSI report and a second instance of the CSI report within a period of the periodic CSI reporting.

At 420, the UE 115- may determine that the trigger condition is satisfied. In one example, the UE 115-*b* may determine that the trigger condition is satisfied based on the DCI indicating both a first SRS resource set associated with the first uplink shared channel transmission and a second SRS resource set associated with the second uplink shared channel transmission. In another example, the UE 115-*b* may determine that the trigger condition is satisfied based on the DCI indicating more than one repetition of uplink shared channel transmissions within the period of the periodic CSI reporting. In another example, the UE 115-*b* may determine that the trigger condition is satisfied based on the one trigger state (e.g., indicated by the DCI) being associated with a CSI reporting configuration that indicates the transmission of both the first instance of the CSI report and the second instance of the CSI report within the period of the periodic CSI reporting. In another example, the UE 115-*b* may determine that the trigger condition is satisfied based on a value of a field within the DCI that is configured to indicate either the transmission of both the first instance of the CSI report and the second instance of the CSI report within the period of the periodic CSI reporting or a transmission of a single CSI report within the period of the periodic CSI reporting.

At 425, the UE 115-*b* may transmit, based on satisfaction of the trigger condition, the first instance of the CSI report via a first uplink shared channel transmission and the second instance of the CSI report via a second uplink shared channel transmission, the first uplink shared channel transmission and the second uplink shared channel transmission both being within the period of the periodic CSI reporting. In a case that the DCI indicates two SRS resource sets associated with the first and second uplink shared channel transmissions, the UE 115-*b* may transmit the first instance of the CSI report via the first uplink shared channel transmission using a first transmission beam associated with the first SRS resource set. Additionally, the UE 115-*b* may transmit the second instance of the CSI report via the second uplink shared channel transmission using a second transmission beam associated with the second SRS resource set.

Figure 5:
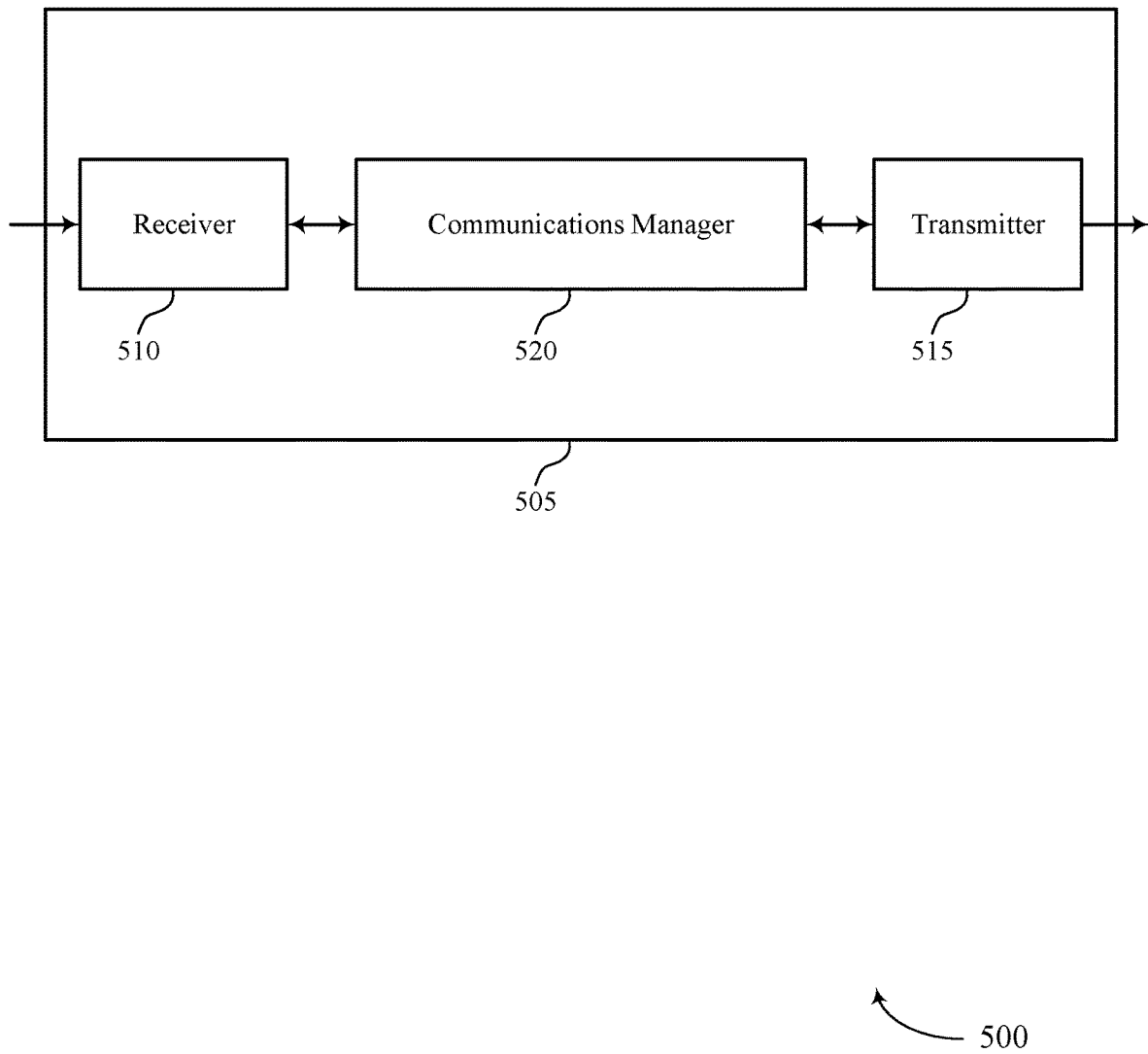
FIGS. 5 and 6 show block diagrams of devices that support semipersistent reporting of CSI in accordance with aspects of the present disclosure.

FIG. 5 shows a block diagram 500 of a device 505 that supports semipersistent reporting of CSI in accordance with aspects of the present disclosure. The device 505 may be an example of aspects of a UE 115 as described herein. The device 505 may include a receiver 510, a transmitter 515, and a communications manager 520. The device 505 may also include a processor. Each of these components may be in communication with one another (e.g., via one or more buses).

The receiver 510 may provide a means for receiving information such as packets, user data, control information, or any combination thereof associated with various information channels (e.g., control channels, data channels, information channels related to semipersistent reporting of CSI). Information may be passed on to other components of the device 505. The receiver 510 may utilize a single antenna or a set of multiple antennas.

The transmitter 515 may provide a means for transmitting signals generated by other components of the device 505. For example, the transmitter 515 may transmit information such as packets, user data, control information, or any combination thereof associated with various information channels (e.g., control channels, data channels, information channels related to semipersistent reporting of CSI). In some examples, the transmitter 515 may be co-located with a receiver 510 in a transceiver module. The transmitter 515 may utilize a single antenna or a set of multiple antennas.

The communications manager 520, the receiver 510, the transmitter 515, or various combinations thereof or various components thereof may be examples of means for performing various aspects of semipersistent reporting of CSI as described herein. For example, the communications manager 520, the receiver 510, the transmitter 515, or various combinations or components thereof may support a method for performing one or more of the functions described herein.

In some examples, the communications manager 520, the receiver 510, the transmitter 515, or various combinations or components thereof may be implemented in hardware (e.g., in communications management circuitry). The hardware may include a processor, a digital signal processor (DSP), an application-specific integrated circuit (ASIC), a field-programmable gate array (FPGA) or other programmable logic device, a discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally or alternatively, in some examples, the communications manager 520, the receiver 510, the transmitter 515, or various combinations or components thereof may be implemented in code (e.g., as communications management software or firmware) executed by a processor. If implemented in code executed by a processor, the functions of the communications manager 520, the receiver 510, the transmitter 515, or various combinations or components thereof may be performed by a general-purpose processor, a DSP, a central processing unit (CPU), an ASIC, an FPGA, or any combination of these or other programmable logic devices (e.g., configured as or otherwise supporting a means for performing the functions described in the present disclosure).

In some examples, the communications manager 520 may be configured to perform various operations (e.g., receiving, monitoring, transmitting) using or otherwise in cooperation with the receiver 510, the transmitter 515, or both. For example, the communications manager 520 may receive information from the receiver 510, send information to the transmitter 515, or be integrated in combination with the receiver 510, the transmitter 515, or both to receive information, transmit information, or perform various other operations as described herein.

The communications manager 520 may support wireless communication at a UE in accordance with examples as disclosed herein. For example, the communications manager 520 may be configured as or otherwise support a means for receiving, from a base station, DCI that activates periodic CSI reporting via uplink shared channel transmissions. The communications manager 520 may be configured as or otherwise support a means for identifying a trigger condition that triggers transmission of both a first instance of a CSI report and a second instance of the CSI report within a period of the periodic CSI reporting. The communications manager 520 may be configured as or otherwise support a means for transmitting, based on satisfaction of the trigger condition, the first instance of the CSI report via a first uplink shared channel transmission and the second instance of the CSI report via a second uplink shared channel transmission, the first uplink shared channel transmission and the second uplink shared channel transmission both being within the period of the periodic CSI reporting.

By including or configuring the communications manager 520 in accordance with examples as described herein, the device 505 (e.g., a processor controlling or otherwise coupled to the receiver 510, the transmitter 515, the communications manager 520, or a combination thereof) may support techniques for improved communications reliability.

Figure 6:
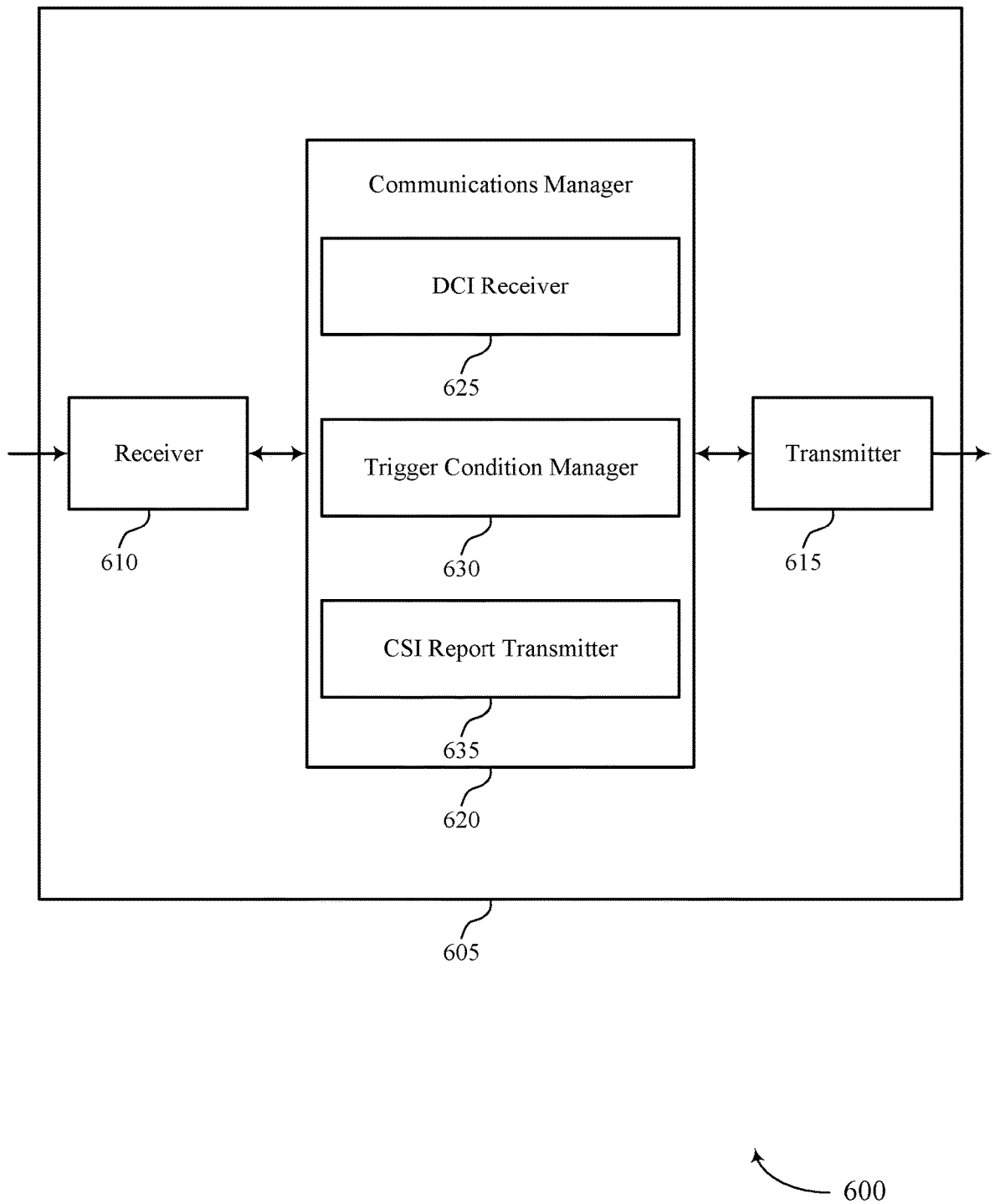

FIG. 6 shows a block diagram 600 of a device 605 that supports semipersistent reporting of CSI in accordance with aspects of the present disclosure. The device 605 may be an example of aspects of a device 505 or a UE 115 as described herein. The device 605 may include a receiver 610, a transmitter 615, and a communications manager 620. The device 605 may also include a processor. Each of these components may be in communication with one another (e.g., via one or more buses).

The receiver 610 may provide a means for receiving information such as packets, user data, control information, or any combination thereof associated with various information channels (e.g., control channels, data channels, information channels related to semipersistent reporting of CSI). Information may be passed on to other components of the device 605. The receiver 610 may utilize a single antenna or a set of multiple antennas.

The transmitter 615 may provide a means for transmitting signals generated by other components of the device 605. For example, the transmitter 615 may transmit information such as packets, user data, control information, or any combination thereof associated with various information channels (e.g., control channels, data channels, information channels related to semipersistent reporting of CSI). In some examples, the transmitter 615 may be co-located with a receiver 610 in a transceiver module. The transmitter 615 may utilize a single antenna or a set of multiple antennas.

The device 605, or various components thereof, may be an example of means for performing various aspects of semipersistent reporting of CSI as described herein. For example, the communications manager 620 may include a DCI receiver 625, a trigger condition manager 630, a CSI report transmitter 635, or any combination thereof. The communications manager 620 may be an example of aspects of a communications manager 520 as described herein. In some examples, the communications manager 620, or various components thereof, may be configured to perform various operations (e.g., receiving, monitoring, transmitting) using or otherwise in cooperation with the receiver 610, the transmitter 615, or both. For example, the communications manager 620 may receive information from the receiver 610, send information to the transmitter 615, or be integrated in combination with the receiver 610, the transmitter 615, or both to receive information, transmit information, or perform various other operations as described herein.

The communications manager 620 may support wireless communication at a UE in accordance with examples as disclosed herein. The DCI receiver 625 may be configured as or otherwise support a means for receiving, from a base station, DCI that activates periodic CSI reporting via uplink shared channel transmissions. The trigger condition manager 630 may be configured as or otherwise support a means for identifying a trigger condition that triggers transmission of both a first instance of a CSI report and a second instance of the CSI report within a period of the periodic CSI reporting. The CSI report transmitter 635 may be configured as or otherwise support a means for transmitting, based on satisfaction of the trigger condition, the first instance of the CSI report via a first uplink shared channel transmission and the second instance of the CSI report via a second uplink shared channel transmission, the first uplink shared channel transmission and the second uplink shared channel transmission both being within the period of the periodic CSI reporting.

Figure 7:
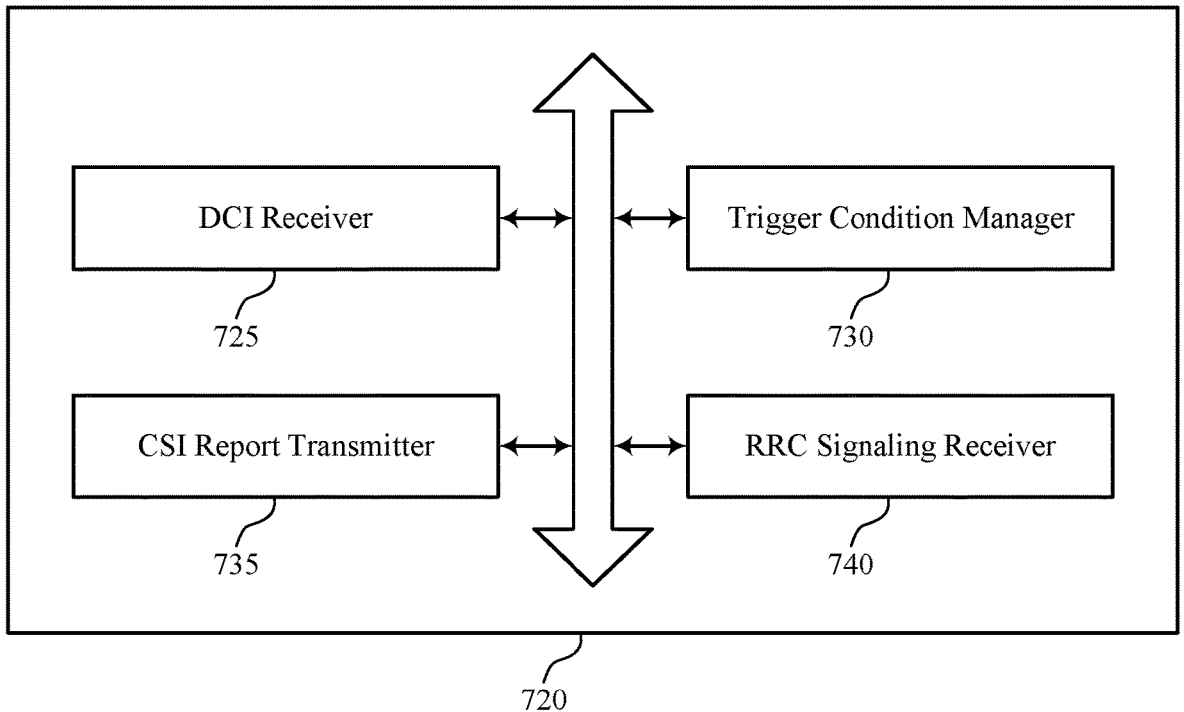
FIG. 7 shows a block diagram of a communications manager that supports semipersistent reporting of CSI in accordance with aspects of the present disclosure.

FIG. 7 shows a block diagram 700 of a communications manager 720 that supports semipersistent reporting of CSI in accordance with aspects of the present disclosure. The communications manager 720 may be an example of aspects of a communications manager 520, a communications manager 620, or both, as described herein. The communications manager 720, or various components thereof, may be an example of means for performing various aspects of semipersistent reporting of CSI as described herein. For example, the communications manager 720 may include a DCI receiver 725, a trigger condition manager 730, a CSI report transmitter 735, an RRC signaling receiver 740, or any combination thereof. Each of these components may communicate, directly or indirectly, with one another (e.g., via one or more buses).

The communications manager 720 may support wireless communication at a UE in accordance with examples as disclosed herein. The DCI receiver 725 may be configured as or otherwise support a means for receiving, from a base station, DCI that activates periodic CSI reporting via uplink shared channel transmissions. The trigger condition manager 730 may be configured as or otherwise support a means for identifying a trigger condition that triggers transmission of both a first instance of a CSI report and a second instance of the CSI report within a period of the periodic CSI reporting. The CSI report transmitter 735 may be configured as or otherwise support a means for transmitting, based on satisfaction of the trigger condition, the first instance of the CSI report via a first uplink shared channel transmission and the second instance of the CSI report via a second uplink shared channel transmission, the first uplink shared channel transmission and the second uplink shared channel transmission both being within the period of the periodic CSI reporting.

In some examples, the trigger condition manager 730 may be configured as or otherwise support a means for determining that the trigger condition is satisfied based on the DCI indicating both a first SRS resource set associated with the first uplink shared channel transmission and a second SRS resource set associated with the second uplink shared channel transmission.

In some examples, to support transmitting, the CSI report transmitter 735 may be configured as or otherwise support a means for transmitting the first instance of the CSI report via the first uplink shared channel transmission using a first transmission beam associated with the first SRS resource set. In some examples, to support transmitting, the CSI report transmitter 735 may be configured as or otherwise support a means for transmitting the second instance of the CSI report via the second uplink shared channel transmission using a second transmission beam associated with the second SRS resource set.

In some examples, the trigger condition manager 730 may be configured as or otherwise support a means for determining that the trigger condition is satisfied based on the DCI indicating more than one repetition of uplink shared channel transmissions within the period of the periodic CSI reporting.

In some examples, the RRC signaling receiver 740 may be configured as or otherwise support a means for receiving, from the base station, RRC signaling indicating a set of multiple trigger states each associated with a CSI reporting configuration, where the DCI activates the periodic CSI reporting by indicating one trigger state from the set of multiple trigger states.

In some examples, the trigger condition manager 730 may be configured as or otherwise support a means for determining that the trigger condition is satisfied based on the one trigger state being associated with a CSI reporting configuration that indicates the transmission of both the first instance of the CSI report and the second instance of the CSI report within the period of the periodic CSI reporting.

In some examples, the trigger condition manager 730 may be configured as or otherwise support a means for determining that the trigger condition is satisfied based on a value of a field within the DCI that is configured to indicate either the transmission of both the first instance of the CSI report and the second instance of the CSI report within the period of the periodic CSI reporting or a transmission of a single CSI report within the period of the periodic CSI reporting.

In some examples, the CSI report transmitter 735 may be configured as or otherwise support a means for determining to transmit two repetitions of a PUSCH transmission within each period of the periodic CSI reporting based on the satisfaction of the trigger condition, the two repetitions including the first uplink shared channel transmission and the second uplink shared channel transmission.

In some examples, a configured quantity of repetitions of the PUSCH transmission within each period of the periodic CSI reporting is one or greater than two.

In some examples, the CSI report transmitter 735 may be configured as or otherwise support a means for determining, after the period of the periodic CSI reporting, a second CSI report to transmit during a second period of the periodic CSI reporting via a third PUSCH transmission and a fourth PUSCH transmission. In some examples, the CSI report transmitter 735 may be configured as or otherwise support a means for identifying that an actual transmission of one PUSCH transmission from the third PUSCH transmission or the fourth PUSCH transmission is different from a nominal transmission of the one PUSCH transmission. In some examples, the CSI report transmitter 735 may be configured as or otherwise support a means for refraining from transmitting the one PUSCH transmission during the second period of the periodic CSI reporting based on identifying that the actual transmission is different from the nominal transmission.

In some examples, the CSI report transmitter 735 may be configured as or otherwise support a means for transmitting, within the second period of the periodic CSI reporting, an other PUSCH transmission from the third PUSCH transmission and the fourth PUSCH transmission including the second CSI report based on an actual transmission of the other PUSCH transmission being the same as a nominal transmission of the other PUSCH transmission.

In some examples, the CSI report transmitter 735 may be configured as or otherwise support a means for refraining from transmitting an other PUSCH transmission from the third PUSCH transmission and the fourth PUSCH transmission based on an actual transmission of the other PUSCH transmission being the different from the nominal transmission of the other PUSCH transmission.

In some examples, the DCI activates the periodic CSI reporting based on indicating a trigger state associated with a CSI reporting configuration indicating a first transmission power and a second transmission power, where transmitting the first instance of the CSI report and the second instance of the CSI report is based on at least one of the first transmission power or the second transmission power.

In some examples, to support transmitting, the CSI report transmitter 735 may be configured as or otherwise support a means for transmitting, according to the first transmission power, the first instance of the CSI report via the first uplink shared channel transmission using a first SRS resource set indicated by the DCI. In some examples, to support transmitting, the CSI report transmitter 735 may be configured as or otherwise support a means for transmitting, according to the second transmission power, the second instance of the CSI report via the second uplink shared channel transmission using a second SRS resource set indicated by the DCI.

In some examples, to support transmitting, the CSI report transmitter 735 may be configured as or otherwise support a means for transmitting both the first instance of the CSI report and the second instance of the CSI report according to the first transmission power based on the DCI indicating a single SRS resource set, where both the first uplink shared channel transmission and the second uplink shared channel transmission use the single SRS resource set.

Figure 8:
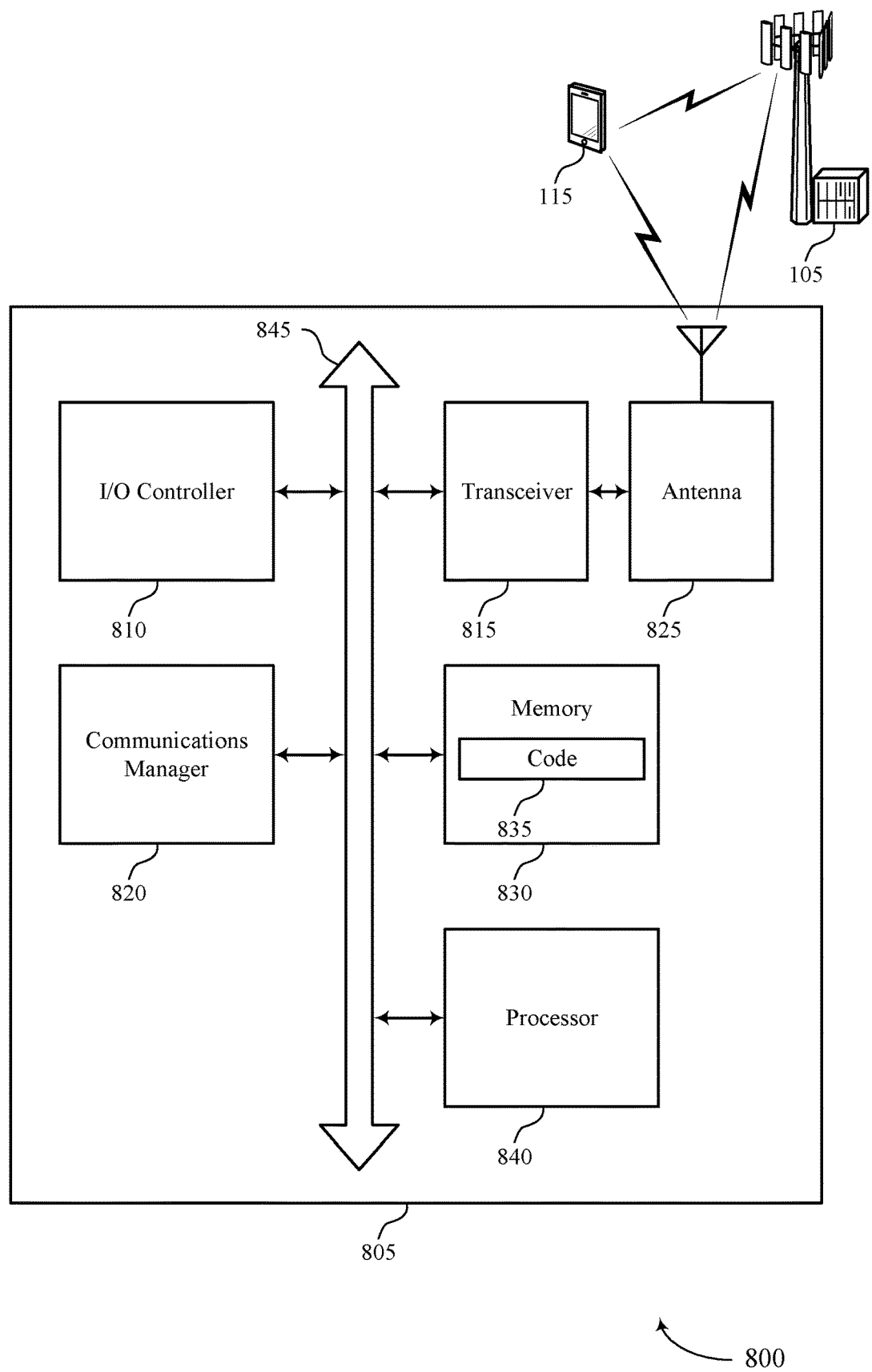
FIG. 8 shows a diagram of a system including a device that supports semipersistent reporting of CSI in accordance with aspects of the present disclosure.

FIG. 8 shows a diagram of a system 800 including a device 805 that supports semipersistent reporting of CSI in accordance with aspects of the present disclosure. The device 805 may be an example of or include the components of a device 505, a device 605, or a UE 115 as described herein. The device 805 may communicate wirelessly with one or more base stations 105, UEs 115, or any combination thereof. The device 805 may include components for bi-directional voice and data communications including components for transmitting and receiving communications, such as a communications manager 820, an input/output (I/O) controller 810, a transceiver 815, an antenna 825, a memory 830, code 835, and a processor 840. These components may be in electronic communication or otherwise coupled (e.g., operatively, communicatively, functionally, electronically, electrically) via one or more buses (e.g., a bus 845).

The I/O controller 810 may manage input and output signals for the device 805. The I/O controller 810 may also manage peripherals not integrated into the device 805. In some cases, the I/O controller 810 may represent a physical connection or port to an external peripheral. In some cases, the I/O controller 810 may utilize an operating system such as iOS®, ANDROID®, MS-DOS®, MS-WINDOWS®, OS/2®, UNIX®, LINUX®, or another known operating system. Additionally or alternatively, the I/O controller 810 may represent or interact with a modem, a keyboard, a mouse, a touchscreen, or a similar device. In some cases, the I/O controller 810 may be implemented as part of a processor, such as the processor 840. In some cases, a user may interact with the device 805 via the I/O controller 810 or via hardware components controlled by the I/O controller 810.

In some cases, the device 805 may include a single antenna 825. However, in some other cases, the device 805 may have more than one antenna 825, which may be capable of concurrently transmitting or receiving multiple wireless transmissions. The transceiver 815 may communicate bi-directionally, via the one or more antennas 825, wired, or wireless links as described herein. For example, the transceiver 815 may represent a wireless transceiver and may communicate bi-directionally with another wireless transceiver. The transceiver 815 may also include a modem to modulate the packets, to provide the modulated packets to one or more antennas 825 for transmission, and to demodulate packets received from the one or more antennas 825. The transceiver 815, or the transceiver 815 and one or more antennas 825, may be an example of a transmitter 515, a transmitter 615, a receiver 510, a receiver 610, or any combination thereof or component thereof, as described herein.

The memory 830 may include random access memory (RAM) and read-only memory (ROM). The memory 830 may store computer-readable, computer-executable code 835 including instructions that, when executed by the processor 840, cause the device 805 to perform various functions described herein. The code 835 may be stored in a non-transitory computer-readable medium such as system memory or another type of memory. In some cases, the code 835 may not be directly executable by the processor 840 but may cause a computer (e.g., when compiled and executed) to perform functions described herein. In some cases, the memory 830 may contain, among other things, a basic I/O system (BIOS) which may control basic hardware or software operation such as the interaction with peripheral components or devices.

The processor 840 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 840 may be configured to operate a memory array using a memory controller. In some other cases, a memory controller may be integrated into the processor 840. The processor 840 may be configured to execute computer-readable instructions stored in a memory (e.g., the memory 830) to cause the device 805 to perform various functions (e.g., functions or tasks supporting semipersistent reporting of CSI). For example, the device 805 or a component of the device 805 may include a processor 840 and memory 830 coupled to the processor 840, the processor 840 and memory 830 configured to perform various functions described herein.

The communications manager 820 may support wireless communication at a UE in accordance with examples as disclosed herein. For example, the communications manager 820 may be configured as or otherwise support a means for receiving, from a base station, DCI that activates periodic CSI reporting via uplink shared channel transmissions. The communications manager 820 may be configured as or otherwise support a means for identifying a trigger condition that triggers transmission of both a first instance of a CSI report and a second instance of the CSI report within a period of the periodic CSI reporting. The communications manager 820 may be configured as or otherwise support a means for transmitting, based on satisfaction of the trigger condition, the first instance of the CSI report via a first uplink shared channel transmission and the second instance of the CSI report via a second uplink shared channel transmission, the first uplink shared channel transmission and the second uplink shared channel transmission both being within the period of the periodic CSI reporting.

By including or configuring the communications manager 820 in accordance with examples as described herein, the device 805 may support techniques for improved communication reliability.

In some examples, the communications manager 820 may be configured to perform various operations (e.g., receiving, monitoring, transmitting) using or otherwise in cooperation with the transceiver 815, the one or more antennas 825, or any combination thereof. Although the communications manager 820 is illustrated as a separate component, in some examples, one or more functions described with reference to the communications manager 820 may be supported by or performed by the processor 840, the memory 830, the code 835, or any combination thereof. For example, the code 835 may include instructions executable by the processor 840 to cause the device 805 to perform various aspects of semipersistent reporting of CSI as described herein, or the processor 840 and the memory 830 may be otherwise configured to perform or support such operations.

Figure 9:
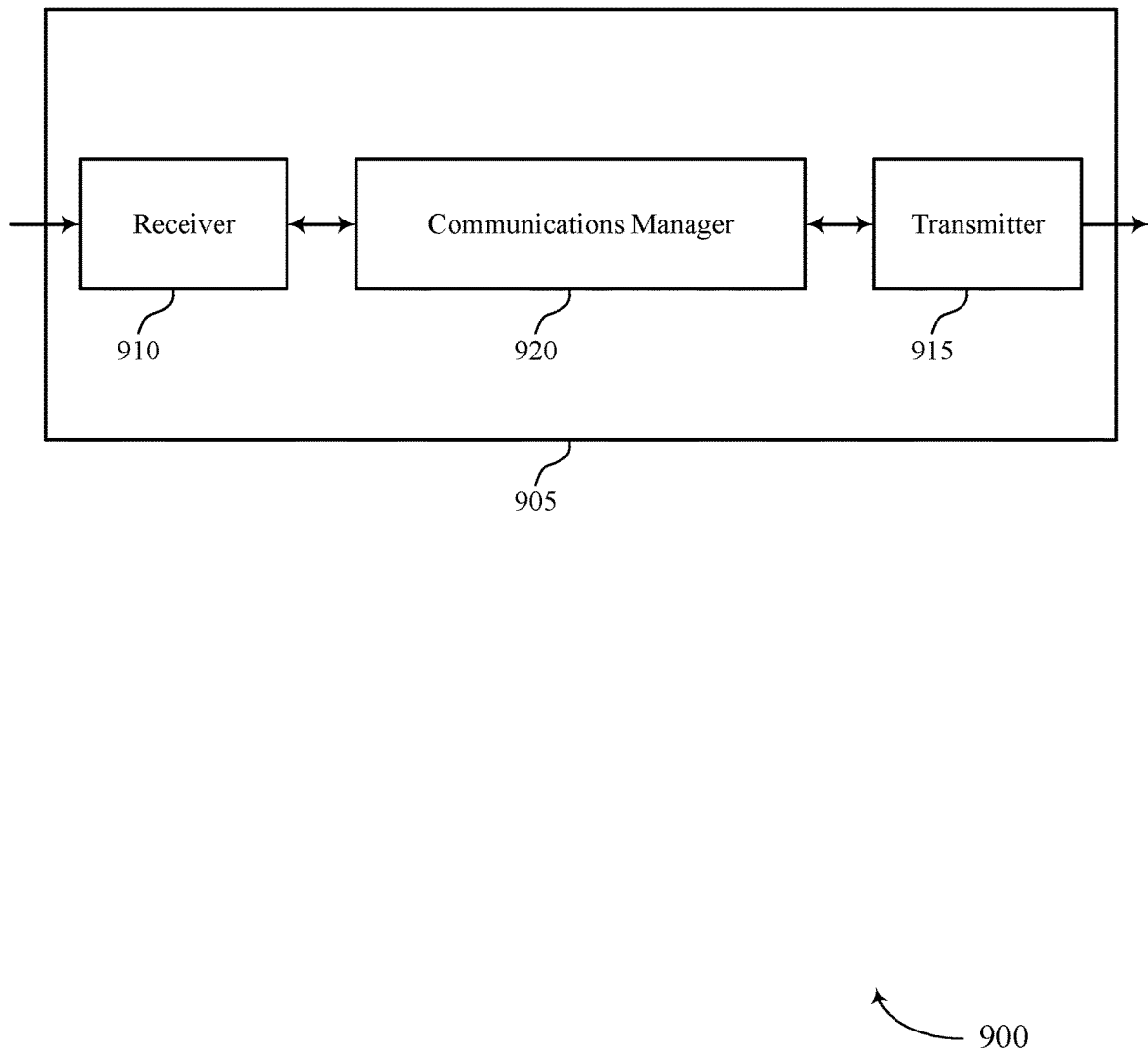
FIGS. 9 and 10 show block diagrams of devices that support semipersistent reporting of CSI in accordance with aspects of the present disclosure.

FIG. 9 shows a block diagram 900 of a device 905 that supports semipersistent reporting of CSI in accordance with aspects of the present disclosure. The device 905 may be an example of aspects of a base station 105 as described herein. The device 905 may include a receiver 910, a transmitter 915, and a communications manager 920. The device 905 may also include a processor. Each of these components may be in communication with one another (e.g., via one or more buses).

The receiver 910 may provide a means for receiving information such as packets, user data, control information, or any combination thereof associated with various information channels (e.g., control channels, data channels, information channels related to semipersistent reporting of CSI). Information may be passed on to other components of the device 905. The receiver 910 may utilize a single antenna or a set of multiple antennas.

The transmitter 915 may provide a means for transmitting signals generated by other components of the device 905. For example, the transmitter 915 may transmit information such as packets, user data, control information, or any combination thereof associated with various information channels (e.g., control channels, data channels, information channels related to semipersistent reporting of CSI). In some examples, the transmitter 915 may be co-located with a receiver 910 in a transceiver module. The transmitter 915 may utilize a single antenna or a set of multiple antennas.

The communications manager 920, the receiver 910, the transmitter 915, or various combinations thereof or various components thereof may be examples of means for performing various aspects of semipersistent reporting of CSI as described herein. For example, the communications manager 920, the receiver 910, the transmitter 915, or various combinations or components thereof may support a method for performing one or more of the functions described herein.

In some examples, the communications manager 920, the receiver 910, the transmitter 915, or various combinations or components thereof may be implemented in hardware (e.g., in communications management circuitry). The hardware may include a processor, a DSP, an ASIC, an FPGA or other programmable logic device, a discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally or alternatively, in some examples, the communications manager 920, the receiver 910, the transmitter 915, or various combinations or components thereof may be implemented in code (e.g., as communications management software or firmware) executed by a processor. If implemented in code executed by a processor, the functions of the communications manager 920, the receiver 910, the transmitter 915, or various combinations or components thereof may be performed by a general-purpose processor, a DSP, a CPU, an ASIC, an FPGA, or any combination of these or other programmable logic devices (e.g., configured as or otherwise supporting a means for performing the functions described in the present disclosure).

In some examples, the communications manager 920 may be configured to perform various operations (e.g., receiving, monitoring, transmitting) using or otherwise in cooperation with the receiver 910, the transmitter 915, or both. For example, the communications manager 920 may receive information from the receiver 910, send information to the transmitter 915, or be integrated in combination with the receiver 910, the transmitter 915, or both to receive information, transmit information, or perform various other operations as described herein.

The communications manager 920 may support wireless communication at a base station in accordance with examples as disclosed herein. For example, the communications manager 920 may be configured as or otherwise support a means for transmitting, to a UE, DCI that activates periodic CSI reporting via uplink shared channel transmissions. The communications manager 920 may be configured as or otherwise support a means for indicating a trigger condition that triggers the UE to transmit both a first instance of a CSI report and a second instance of the CSI report within a period of the periodic CSI reporting. The communications manager 920 may be configured as or otherwise support a means for receiving, based on satisfaction of the trigger condition, the first instance of the CSI report via a first uplink shared channel transmission and the second instance of the CSI report via a second uplink shared channel transmission, the first uplink shared channel transmission and the second uplink shared channel transmission both being within the period of the periodic CSI reporting.

By including or configuring the communications manager 920 in accordance with examples as described herein, the device 905 (e.g., a processor controlling or otherwise coupled to the receiver 910, the transmitter 915, the communications manager 920, or a combination thereof) may support techniques for improved communications reliability.

Figure 10:
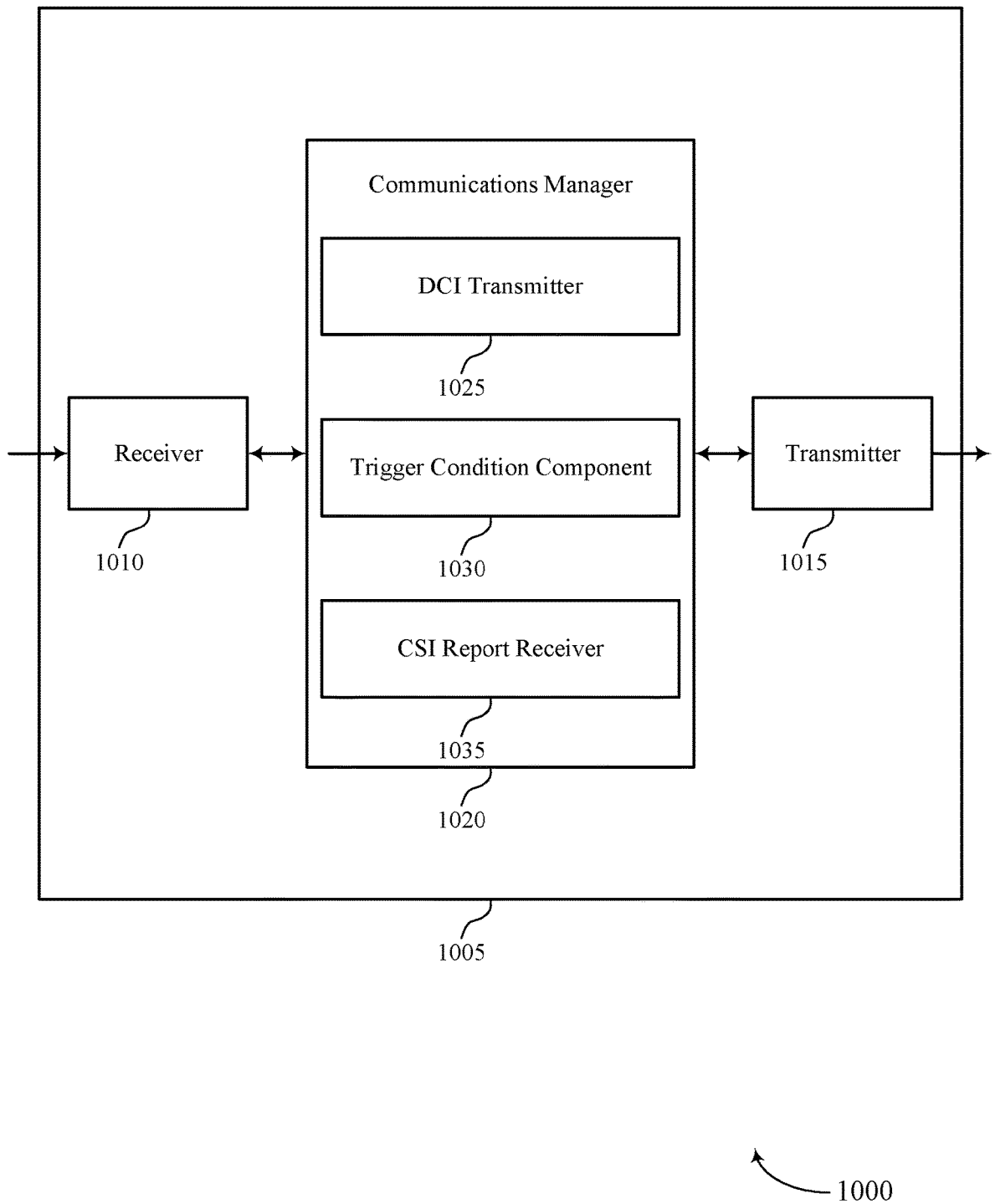

FIG. 10 shows a block diagram 1000 of a device 1005 that supports semipersistent reporting of CSI in accordance with aspects of the present disclosure. The device 1005 may be an example of aspects of a device 905 or a base station 105 as described herein. The device 1005 may include a receiver 1010, a transmitter 1015, and a communications manager 1020. The device 1005 may also include a processor. Each of these components may be in communication with one another (e.g., via one or more buses).

The receiver 1010 may provide a means for receiving information such as packets, user data, control information, or any combination thereof associated with various information channels (e.g., control channels, data channels, information channels related to semipersistent reporting of CSI). Information may be passed on to other components of the device 1005. The receiver 1010 may utilize a single antenna or a set of multiple antennas.

The transmitter 1015 may provide a means for transmitting signals generated by other components of the device 1005. For example, the transmitter 1015 may transmit information such as packets, user data, control information, or any combination thereof associated with various information channels (e.g., control channels, data channels, information channels related to semipersistent reporting of CSI). In some examples, the transmitter 1015 may be co-located with a receiver 1010 in a transceiver module. The transmitter 1015 may utilize a single antenna or a set of multiple antennas.

The device 1005, or various components thereof, may be an example of means for performing various aspects of semipersistent reporting of CSI as described herein. For example, the communications manager 1020 may include a DCI transmitter 1025, a trigger condition component 1030, a CSI report receiver 1035, or any combination thereof. The communications manager 1020 may be an example of aspects of a communications manager 920 as described herein. In some examples, the communications manager 1020, or various components thereof, may be configured to perform various operations (e.g., receiving, monitoring, transmitting) using or otherwise in cooperation with the receiver 1010, the transmitter 1015, or both. For example, the communications manager 1020 may receive information from the receiver 1010, send information to the transmitter 1015, or be integrated in combination with the receiver 1010, the transmitter 1015, or both to receive information, transmit information, or perform various other operations as described herein.

The communications manager 1020 may support wireless communication at a base station in accordance with examples as disclosed herein. The DCI transmitter 1025 may be configured as or otherwise support a means for transmitting, to a UE, DCI that activates periodic CSI reporting via uplink shared channel transmissions. The trigger condition component 1030 may be configured as or otherwise support a means for indicating a trigger condition that triggers the UE to transmit both a first instance of a CSI report and a second instance of the CSI report within a period of the periodic CSI reporting. The CSI report receiver 1035 may be configured as or otherwise support a means for receiving, based on satisfaction of the trigger condition, the first instance of the CSI report via a first uplink shared channel transmission and the second instance of the CSI report via a second uplink shared channel transmission, the first uplink shared channel transmission and the second uplink shared channel transmission both being within the period of the periodic CSI reporting.

Figure 11:
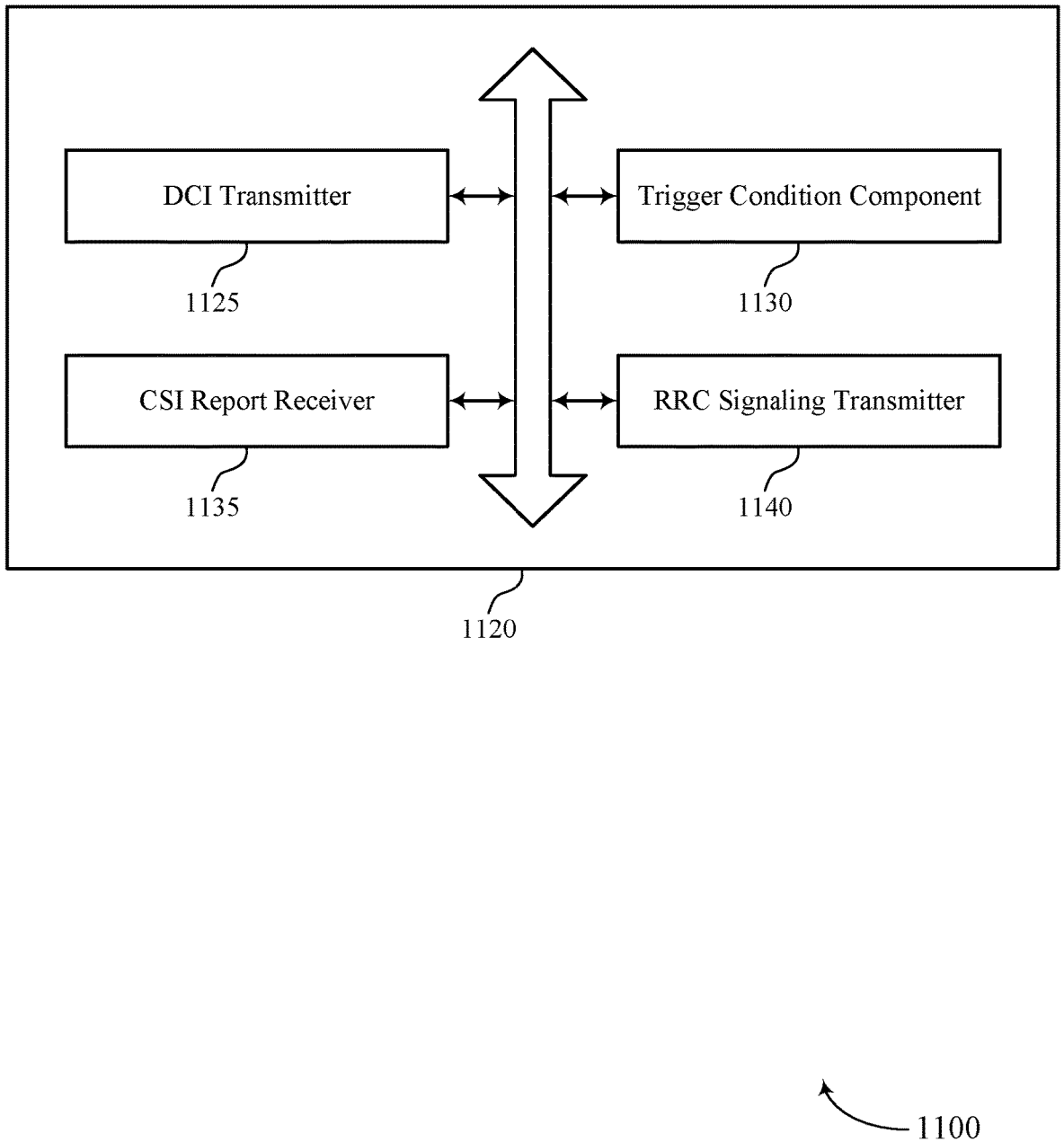
FIG. 11 shows a block diagram of a communications manager that supports semipersistent reporting of CSI in accordance with aspects of the present disclosure.

FIG. 11 shows a block diagram 1100 of a communications manager 1120 that supports semipersistent reporting of CSI in accordance with aspects of the present disclosure. The communications manager 1120 may be an example of aspects of a communications manager 920, a communications manager 1020, or both, as described herein. The communications manager 1120, or various components thereof, may be an example of means for performing various aspects of semipersistent reporting of CSI as described herein. For example, the communications manager 1120 may include a DCI transmitter 1125, a trigger condition component 1130, a CSI report receiver 1135, an RRC signaling transmitter 1140, or any combination thereof. Each of these components may communicate, directly or indirectly, with one another (e.g., via one or more buses).

The communications manager 1120 may support wireless communication at a base station in accordance with examples as disclosed herein. The DCI transmitter 1125 may be configured as or otherwise support a means for transmitting, to a UE, DCI that activates periodic CSI reporting via uplink shared channel transmissions. The trigger condition component 1130 may be configured as or otherwise support a means for indicating a trigger condition that triggers the UE to transmit both a first instance of a CSI report and a second instance of the CSI report within a period of the periodic CSI reporting. The CSI report receiver 1135 may be configured as or otherwise support a means for receiving, based on satisfaction of the trigger condition, the first instance of the CSI report via a first uplink shared channel transmission and the second instance of the CSI report via a second uplink shared channel transmission, the first uplink shared channel transmission and the second uplink shared channel transmission both being within the period of the periodic CSI reporting.

In some examples, the trigger condition is satisfied based on the DCI indicating both a first SRS resource set associated with the first uplink shared channel transmission and a second SRS resource set associated with the second uplink shared channel transmission.

In some examples, the first instance of the CSI report received via the first uplink shared channel transmission is associated with a first transmission beam corresponding to the first SRS resource set. In some examples, the second instance of the CSI report received via the second uplink shared channel transmission is associated with a second transmission beam corresponding to the second SRS resource set.

In some examples, the trigger condition is satisfied based on the DCI indicating more than one repetition of uplink shared channel transmissions within the period of the periodic CSI reporting.

In some examples, the RRC signaling transmitter 1140 may be configured as or otherwise support a means for transmitting, to the UE, RRC signaling indicating a set of multiple trigger states each associated with a CSI reporting configuration, where the DCI activates the periodic CSI reporting by indicating one trigger state from the set of multiple trigger states.

In some examples, the trigger condition is satisfied based on the one trigger state being associated with a CSI reporting configuration that indicates for the UE to transmit both the first instance of the CSI report and the second instance of the CSI report within the period of the periodic CSI reporting.

In some examples, the trigger condition is satisfied based on a value of a field within the DCI that is configured to indicate either for the UE to transmit both the first instance of the CSI report and the second instance of the CSI report within the period of the periodic CSI reporting or for the UE to transmit a single CSI report within the period of the periodic CSI reporting.

In some examples, the DCI activates the periodic CSI reporting based on indicating a trigger state associated with a CSI reporting configuration indicating a first transmission power and a second transmission power, where receiving the first instance of the CSI report and the second instance of the CSI report is based on at least one of the first transmission power or the second transmission power.

In some examples, to support receiving, the CSI report receiver 1135 may be configured as or otherwise support a means for receiving the first instance of the CSI report via the first uplink shared channel transmission having the first transmission power and associated with a first SRS resource set indicated by the DCI. In some examples, to support receiving, the CSI report receiver 1135 may be configured as or otherwise support a means for receiving the second instance of the CSI report via the second uplink shared channel transmission having the second transmission power and associated with a second SRS resource set indicated by the DCI.

In some examples, to support receiving, the CSI report receiver 1135 may be configured as or otherwise support a means for receiving both the first uplink shared channel transmission and the second uplink shared channel transmission using a single SRS resource set based on the DCI indicating the single SRS resource set, where both the first uplink shared channel transmission and the second uplink shared channel transmission have the first transmission power.

Figure 12:
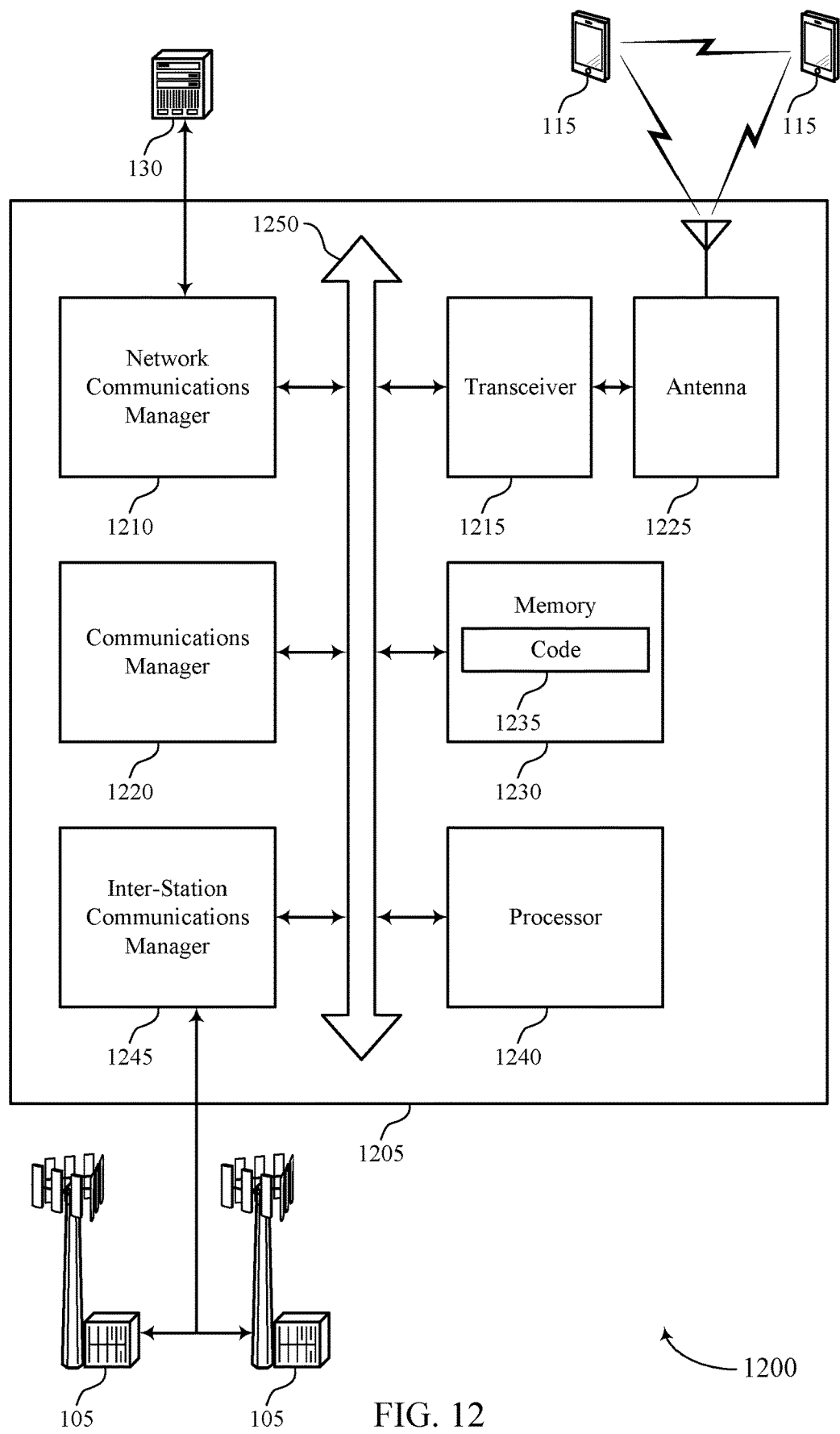
FIG. 12 shows a diagram of a system including a device that supports semipersistent reporting of CSI in accordance with aspects of the present disclosure.

FIG. 12 shows a diagram of a system 1200 including a device 1205 that supports semipersistent reporting of CSI in accordance with aspects of the present disclosure. The device 1205 may be an example of or include the components of a device 905, a device 1005, or a base station 105 as described herein. The device 1205 may communicate wirelessly with one or more base stations 105, UEs 115, or any combination thereof. The device 1205 may include components for bi-directional voice and data communications including components for transmitting and receiving communications, such as a communications manager 1220, a network communications manager 1210, a transceiver 1215, an antenna 1225, a memory 1230, code 1235, a processor 1240, and an inter-station communications manager 1245. These components may be in electronic communication or otherwise coupled (e.g., operatively, communicatively, functionally, electronically, electrically) via one or more buses (e.g., a bus 1250).

The network communications manager 1210 may manage communications with a core network 130 (e.g., via one or more wired backhaul links). For example, the network communications manager 1210 may manage the transfer of data communications for client devices, such as one or more UEs 115.

In some cases, the device 1205 may include a single antenna 1225. However, in some other cases the device 1205 may have more than one antenna 1225, which may be capable of concurrently transmitting or receiving multiple wireless transmissions. The transceiver 1215 may communicate bi-directionally, via the one or more antennas 1225, wired, or wireless links as described herein. For example, the transceiver 1215 may represent a wireless transceiver and may communicate bi-directionally with another wireless transceiver. The transceiver 1215 may also include a modem to modulate the packets, to provide the modulated packets to one or more antennas 1225 for transmission, and to demodulate packets received from the one or more antennas 1225. The transceiver 1215, or the transceiver 1215 and one or more antennas 1225, may be an example of a transmitter 915, a transmitter 1015, a receiver 910, a receiver 1010, or any combination thereof or component thereof, as described herein.

The memory 1230 may include RAM and ROM. The memory 1230 may store computer-readable, computer-executable code 1235 including instructions that, when executed by the processor 1240, cause the device 1205 to perform various functions described herein. The code 1235 may be stored in a non-transitory computer-readable medium such as system memory or another type of memory. In some cases, the code 1235 may not be directly executable by the processor 1240 but may cause a computer (e.g., when compiled and executed) to perform functions described herein. In some cases, the memory 1230 may contain, among other things, a BIOS which may control basic hardware or software operation such as the interaction with peripheral components or devices.

The processor 1240 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1240 may be configured to operate a memory array using a memory controller. In some other cases, a memory controller may be integrated into the processor 1240. The processor 1240 may be configured to execute computer-readable instructions stored in a memory (e.g., the memory 1230) to cause the device 1205 to perform various functions (e.g., functions or tasks supporting semipersistent reporting of CSI). For example, the device 1205 or a component of the device 1205 may include a processor 1240 and memory 1230 coupled to the processor 1240, the processor 1240 and memory 1230 configured to perform various functions described herein.

The inter-station communications manager 1245 may manage communications with other base stations 105, and may include a controller or scheduler for controlling communications with UEs 115 in cooperation with other base stations 105. For example, the inter-station communications manager 1245 may coordinate scheduling for transmissions to UEs 115 for various interference mitigation techniques such as beamforming or joint transmission. In some examples, the inter-station communications manager 1245 may provide an X2 interface within an LTE/LTE-A wireless communications network technology to provide communication between base stations 105.

The communications manager 1220 may support wireless communication at a base station in accordance with examples as disclosed herein. For example, the communications manager 1220 may be configured as or otherwise support a means for transmitting, to a UE, DCI that activates periodic CSI reporting via uplink shared channel transmissions. The communications manager 1220 may be configured as or otherwise support a means for indicating a trigger condition that triggers the UE to transmit both a first instance of a CSI report and a second instance of the CSI report within a period of the periodic CSI reporting. The communications manager 1220 may be configured as or otherwise support a means for receiving, based on satisfaction of the trigger condition, the first instance of the CSI report via a first uplink shared channel transmission and the second instance of the CSI report via a second uplink shared channel transmission, the first uplink shared channel transmission and the second uplink shared channel transmission both being within the period of the periodic CSI reporting.

By including or configuring the communications manager 1220 in accordance with examples as described herein, the device 1205 may support techniques for improved communication reliability.

In some examples, the communications manager 1220 may be configured to perform various operations (e.g., receiving, monitoring, transmitting) using or otherwise in cooperation with the transceiver 1215, the one or more antennas 1225, or any combination thereof. Although the communications manager 1220 is illustrated as a separate component, in some examples, one or more functions described with reference to the communications manager 1220 may be supported by or performed by the processor 1240, the memory 1230, the code 1235, or any combination thereof. For example, the code 1235 may include instructions executable by the processor 1240 to cause the device 1205 to perform various aspects of semipersistent reporting of CSI as described herein, or the processor 1240 and the memory 1230 may be otherwise configured to perform or support such operations.

Figure 13:
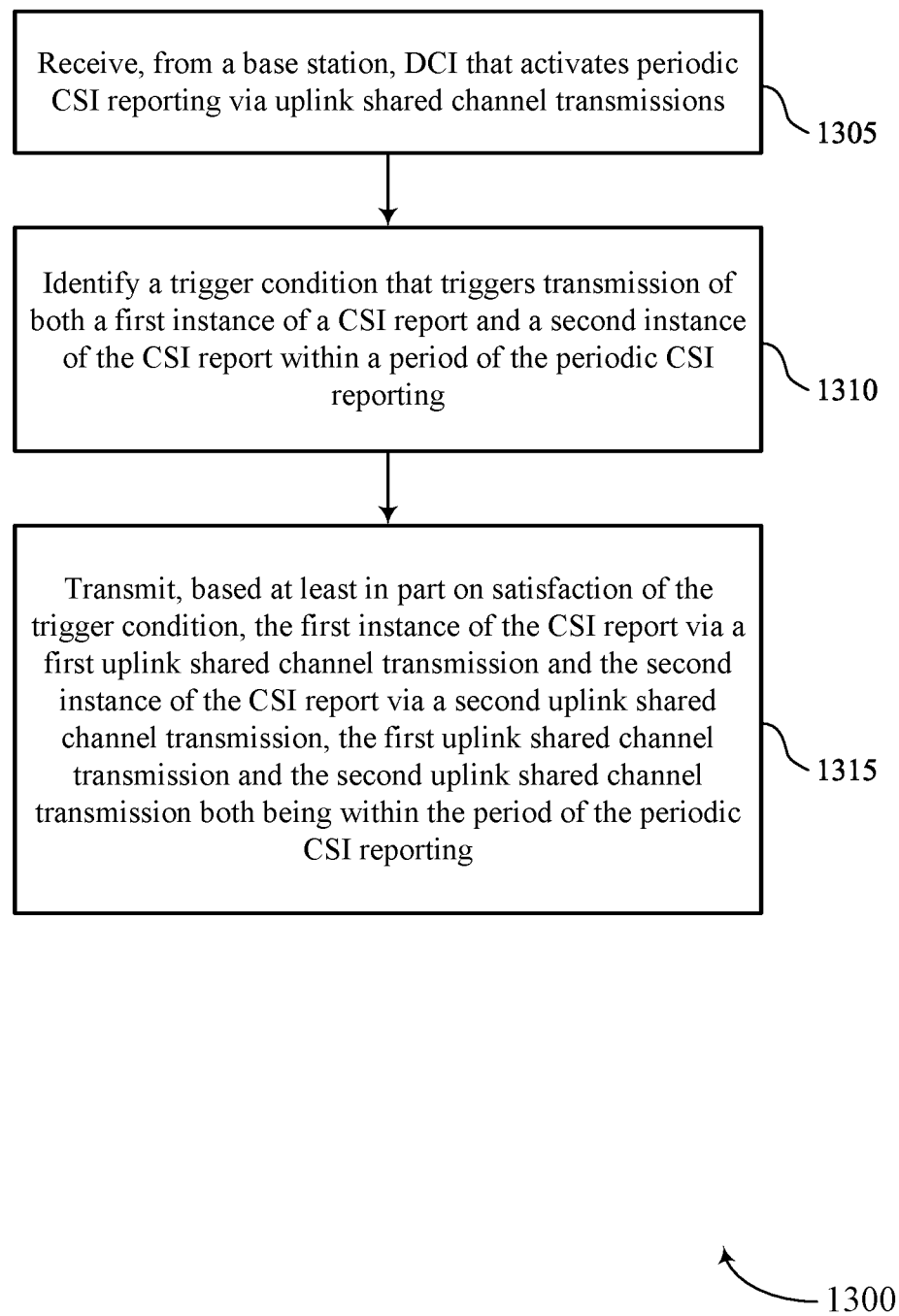
FIGS. 13 through 19 show flowcharts illustrating methods that support semipersistent reporting of CSI in accordance with aspects of the present disclosure.

FIG. 13 shows a flowchart illustrating a method 1300 that supports semipersistent reporting of CSI in accordance with aspects of the present disclosure. The operations of the method 1300 may be implemented by a UE or its components as described herein. For example, the operations of the method 1300 may be performed by a UE 115 as described with reference to FIGS. 1 through 8. In some examples, a UE may execute a set of instructions to control the functional elements of the UE to perform the described functions. Additionally or alternatively, the UE may perform aspects of the described functions using special-purpose hardware.

At 1305, the method may include receiving, from a base station, DCI that activates periodic CSI reporting via uplink shared channel transmissions. The operations of 1305 may be performed in accordance with examples as disclosed herein. In some examples, aspects of the operations of 1305 may be performed by a DCI receiver 725 as described with reference to FIG. 7.

At 1310, the method may include identifying a trigger condition that triggers transmission of both a first instance of a CSI report and a second instance of the CSI report within a period of the periodic CSI reporting. The operations of 1310 may be performed in accordance with examples as disclosed herein. In some examples, aspects of the operations of 1310 may be performed by a trigger condition manager 730 as described with reference to FIG. 7.

At 1315, the method may include transmitting, based on satisfaction of the trigger condition, the first instance of the CSI report via a first uplink shared channel transmission and the second instance of the CSI report via a second uplink shared channel transmission, the first uplink shared channel transmission and the second uplink shared channel transmission both being within the period of the periodic CSI reporting. The operations of 1315 may be performed in accordance with examples as disclosed herein. In some examples, aspects of the operations of 1315 may be performed by a CSI report transmitter 735 as described with reference to FIG. 7.

Figure 14:
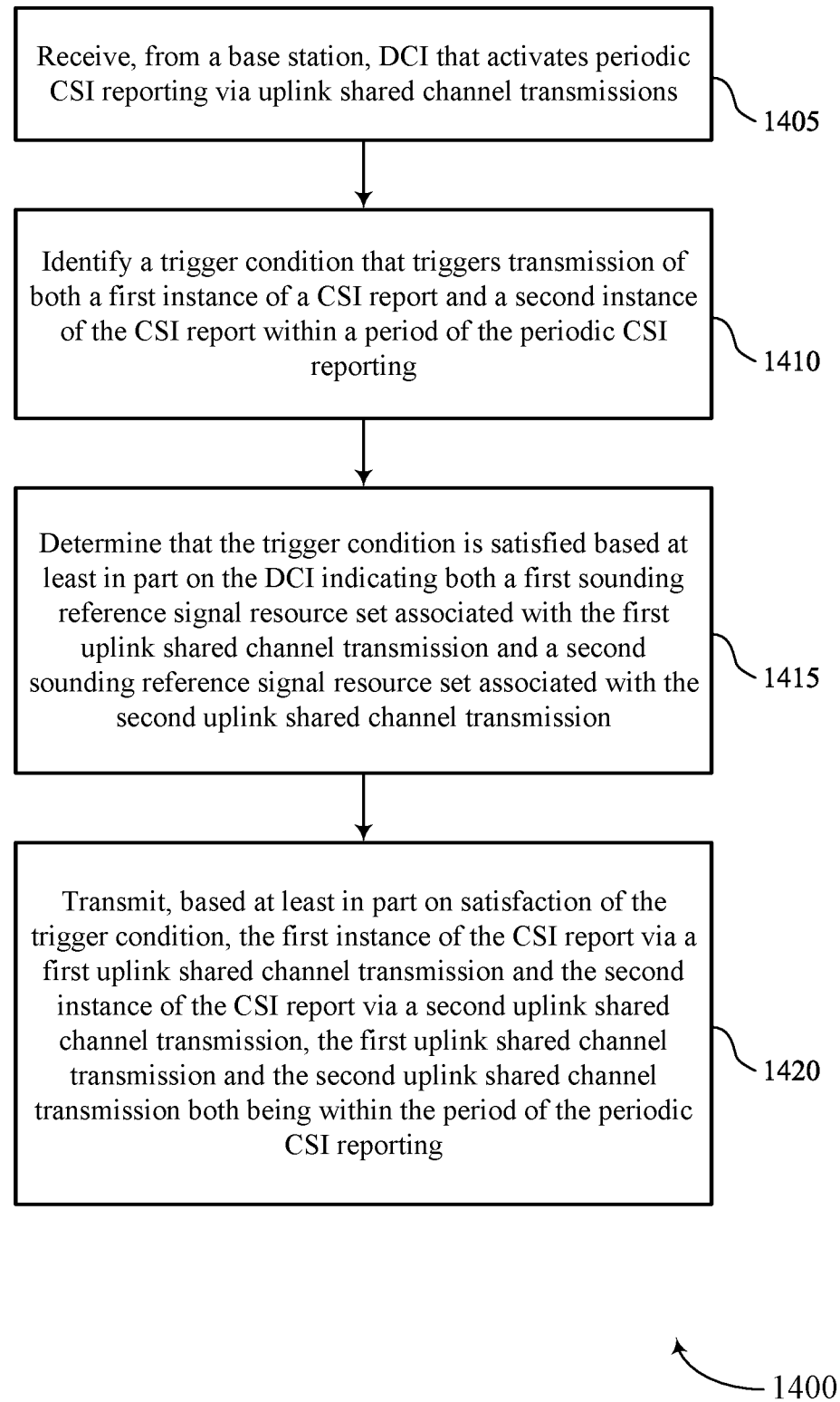

FIG. 14 shows a flowchart illustrating a method 1400 that supports semipersistent reporting of CSI in accordance with aspects of the present disclosure. The operations of the method 1400 may be implemented by a UE or its components as described herein. For example, the operations of the method 1400 may be performed by a UE 115 as described with reference to FIGS. 1 through 8. In some examples, a UE may execute a set of instructions to control the functional elements of the UE to perform the described functions. Additionally or alternatively, the UE may perform aspects of the described functions using special-purpose hardware.

At 1405, the method may include receiving, from a base station, DCI that activates periodic CSI reporting via uplink shared channel transmissions. The operations of 1405 may be performed in accordance with examples as disclosed herein. In some examples, aspects of the operations of 1405 may be performed by a DCI receiver 725 as described with reference to FIG. 7.

At 1410, the method may include identifying a trigger condition that triggers transmission of both a first instance of a CSI report and a second instance of the CSI report within a period of the periodic CSI reporting. The operations of 1410 may be performed in accordance with examples as disclosed herein. In some examples, aspects of the operations of 1410 may be performed by a trigger condition manager 730 as described with reference to FIG. 7.

At 1415, the method may include determining that the trigger condition is satisfied based on the DCI indicating both a first SRS resource set associated with the first uplink shared channel transmission and a second SRS resource set associated with the second uplink shared channel transmission. The operations of 1415 may be performed in accordance with examples as disclosed herein. In some examples, aspects of the operations of 1415 may be performed by a trigger condition manager 730 as described with reference to FIG. 7.

At 1420, the method may include transmitting, based on satisfaction of the trigger condition, the first instance of the CSI report via a first uplink shared channel transmission and the second instance of the CSI report via a second uplink shared channel transmission, the first uplink shared channel transmission and the second uplink shared channel transmission both being within the period of the periodic CSI reporting. The operations of 1420 may be performed in accordance with examples as disclosed herein. In some examples, aspects of the operations of 1420 may be performed by a CSI report transmitter 735 as described with reference to FIG. 7.

Figure 15:
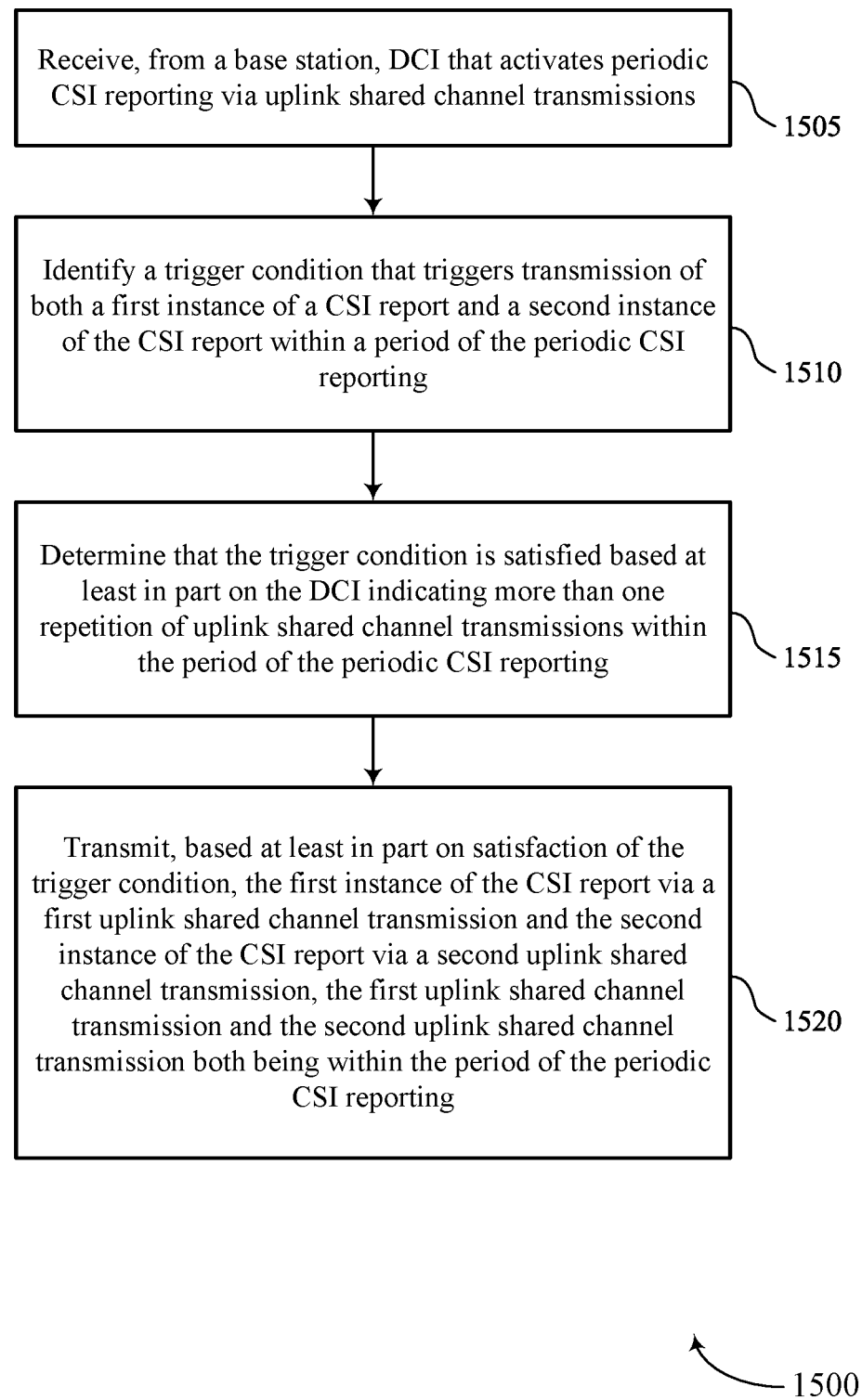

FIG. 15 shows a flowchart illustrating a method 1500 that supports semipersistent reporting of CSI in accordance with aspects of the present disclosure. The operations of the method 1500 may be implemented by a UE or its components as described herein. For example, the operations of the method 1500 may be performed by a UE 115 as described with reference to FIGS. 1 through 8. In some examples, a UE may execute a set of instructions to control the functional elements of the UE to perform the described functions. Additionally or alternatively, the UE may perform aspects of the described functions using special-purpose hardware.

At 1505, the method may include receiving, from a base station, DCI that activates periodic CSI reporting via uplink shared channel transmissions. The operations of 1505 may be performed in accordance with examples as disclosed herein. In some examples, aspects of the operations of 1505 may be performed by a DCI receiver 725 as described with reference to FIG. 7.

At 1510, the method may include identifying a trigger condition that triggers transmission of both a first instance of a CSI report and a second instance of the CSI report within a period of the periodic CSI reporting. The operations of 1510 may be performed in accordance with examples as disclosed herein. In some examples, aspects of the operations of 1510 may be performed by a trigger condition manager 730 as described with reference to FIG. 7.

At 1515, the method may include determining that the trigger condition is satisfied based on the DCI indicating more than one repetition of uplink shared channel transmissions within the period of the periodic CSI reporting. The operations of 1515 may be performed in accordance with examples as disclosed herein. In some examples, aspects of the operations of 1515 may be performed by a trigger condition manager 730 as described with reference to FIG. 7.

At 1520, the method may include transmitting, based on satisfaction of the trigger condition, the first instance of the CSI report via a first uplink shared channel transmission and the second instance of the CSI report via a second uplink shared channel transmission, the first uplink shared channel transmission and the second uplink shared channel transmission both being within the period of the periodic CSI reporting. The operations of 1520 may be performed in accordance with examples as disclosed herein. In some examples, aspects of the operations of 1520 may be performed by a CSI report transmitter 735 as described with reference to FIG. 7.

Figure 16:
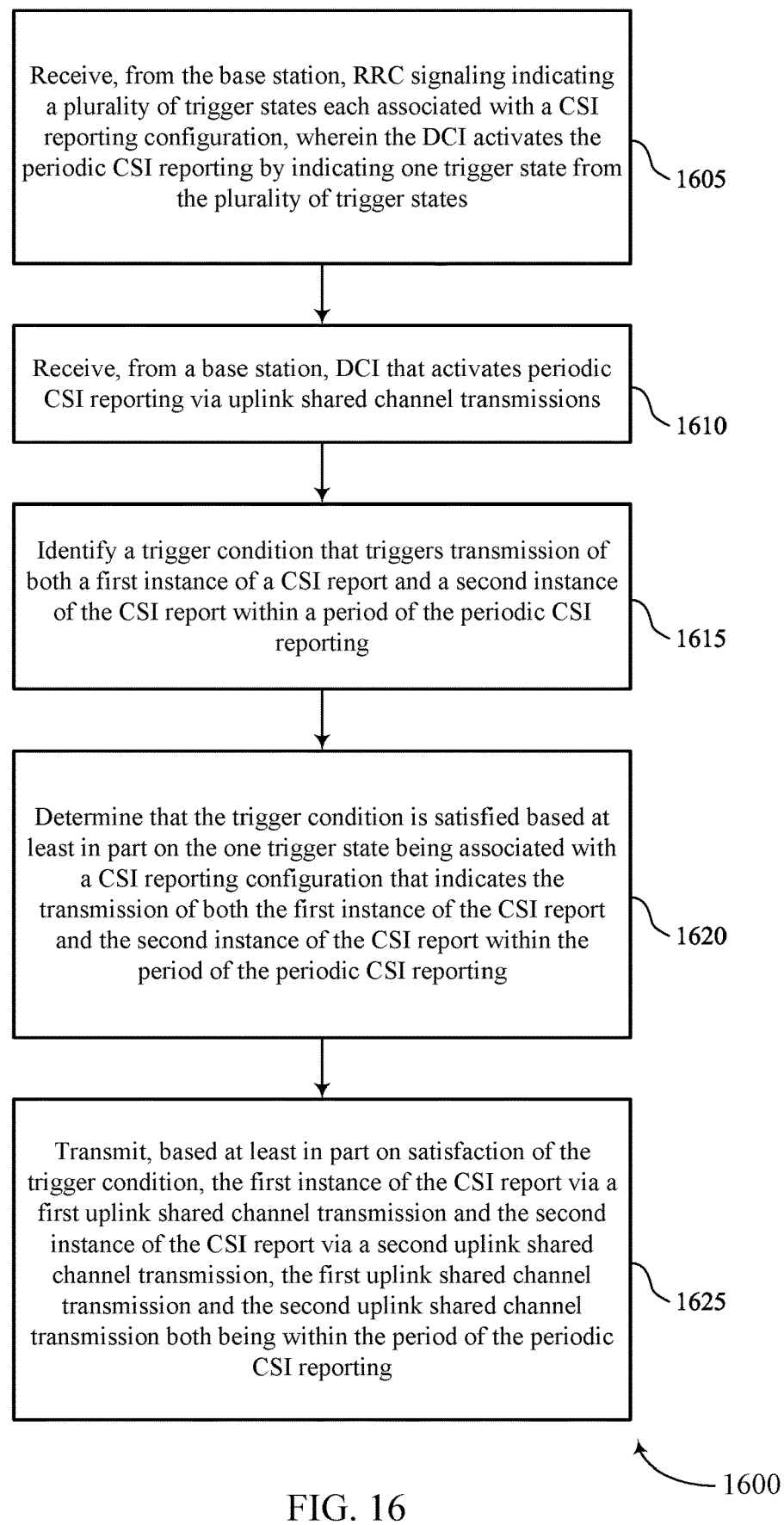

FIG. 16 shows a flowchart illustrating a method 1600 that supports semipersistent reporting of CSI in accordance with aspects of the present disclosure. The operations of the method 1600 may be implemented by a UE or its components as described herein. For example, the operations of the method 1600 may be performed by a UE 115 as described with reference to FIGS. 1 through 8. In some examples, a UE may execute a set of instructions to control the functional elements of the UE to perform the described functions. Additionally or alternatively, the UE may perform aspects of the described functions using special-purpose hardware.

At 1605, the method may include receiving, from the base station, RRC signaling indicating a set of multiple trigger states each associated with a CSI reporting configuration, where the DCI activates the periodic CSI reporting by indicating one trigger state from the set of multiple trigger states. The operations of 1605 may be performed in accordance with examples as disclosed herein. In some examples, aspects of the operations of 1605 may be performed by an RRC signaling receiver 740 as described with reference to FIG. 7.

At 1610, the method may include receiving, from a base station, DCI that activates periodic CSI reporting via uplink shared channel transmissions. The operations of 1610 may be performed in accordance with examples as disclosed herein. In some examples, aspects of the operations of 1610 may be performed by a DCI receiver 725 as described with reference to FIG. 7.

At 1615, the method may include identifying a trigger condition that triggers transmission of both a first instance of a CSI report and a second instance of the CSI report within a period of the periodic CSI reporting. The operations of 1615 may be performed in accordance with examples as disclosed herein. In some examples, aspects of the operations of 1615 may be performed by a trigger condition manager 730 as described with reference to FIG. 7.

At 1620, the method may include determining that the trigger condition is satisfied based on the one trigger state being associated with a CSI reporting configuration that indicates the transmission of both the first instance of the CSI report and the second instance of the CSI report within the period of the periodic CSI reporting. The operations of 1620 may be performed in accordance with examples as disclosed herein. In some examples, aspects of the operations of 1620 may be performed by a trigger condition manager 730 as described with reference to FIG. 7.

At 1625, the method may include transmitting, based on satisfaction of the trigger condition, the first instance of the CSI report via a first uplink shared channel transmission and the second instance of the CSI report via a second uplink shared channel transmission, the first uplink shared channel transmission and the second uplink shared channel transmission both being within the period of the periodic CSI reporting. The operations of 1625 may be performed in accordance with examples as disclosed herein. In some examples, aspects of the operations of 1625 may be performed by a CSI report transmitter 735 as described with reference to FIG. 7.

Figure 17:
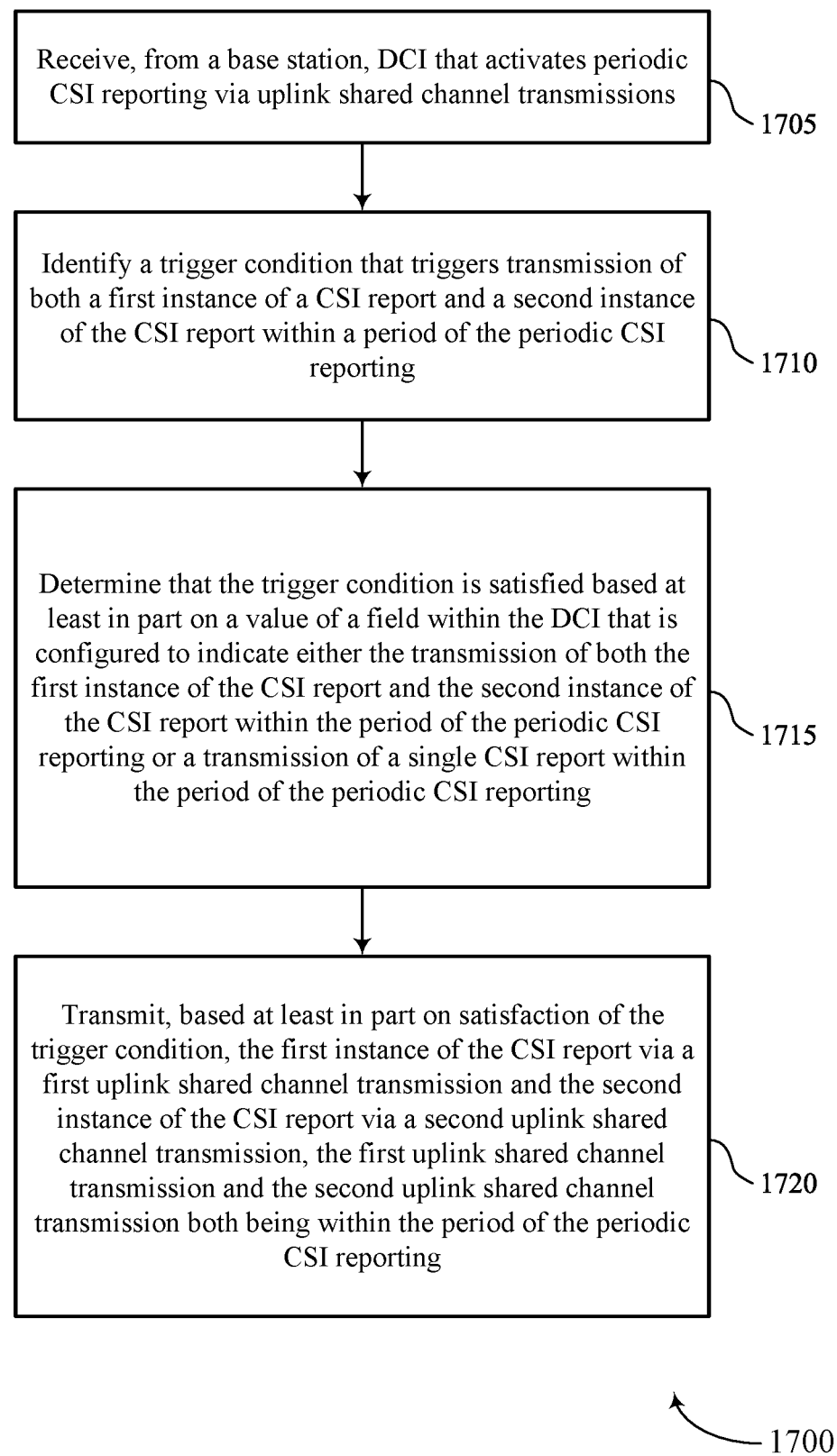

FIG. 17 shows a flowchart illustrating a method 1700 that supports semipersistent reporting of CSI in accordance with aspects of the present disclosure. The operations of the method 1700 may be implemented by a UE or its components as described herein. For example, the operations of the method 1700 may be performed by a UE 115 as described with reference to FIGS. 1 through 8. In some examples, a UE may execute a set of instructions to control the functional elements of the UE to perform the described functions. Additionally or alternatively, the UE may perform aspects of the described functions using special-purpose hardware.

At 1705, the method may include receiving, from a base station, DCI that activates periodic CSI reporting via uplink shared channel transmissions. The operations of 1705 may be performed in accordance with examples as disclosed herein. In some examples, aspects of the operations of 1705 may be performed by a DCI receiver 725 as described with reference to FIG. 7.

At 1710, the method may include identifying a trigger condition that triggers transmission of both a first instance of a CSI report and a second instance of the CSI report within a period of the periodic CSI reporting. The operations of 1710 may be performed in accordance with examples as disclosed herein. In some examples, aspects of the operations of 1710 may be performed by a trigger condition manager 730 as described with reference to FIG. 7.

At 1715, the method may include determining that the trigger condition is satisfied based on a value of a field within the DCI that is configured to indicate either the transmission of both the first instance of the CSI report and the second instance of the CSI report within the period of the periodic CSI reporting or a transmission of a single CSI report within the period of the periodic CSI reporting. The operations of 1715 may be performed in accordance with examples as disclosed herein. In some examples, aspects of the operations of 1715 may be performed by a trigger condition manager 730 as described with reference to FIG. 7.

At 1720, the method may include transmitting, based on satisfaction of the trigger condition, the first instance of the CSI report via a first uplink shared channel transmission and the second instance of the CSI report via a second uplink shared channel transmission, the first uplink shared channel transmission and the second uplink shared channel transmission both being within the period of the periodic CSI reporting. The operations of 1720 may be performed in accordance with examples as disclosed herein. In some examples, aspects of the operations of 1720 may be performed by a CSI report transmitter 735 as described with reference to FIG. 7.

Figure 18:
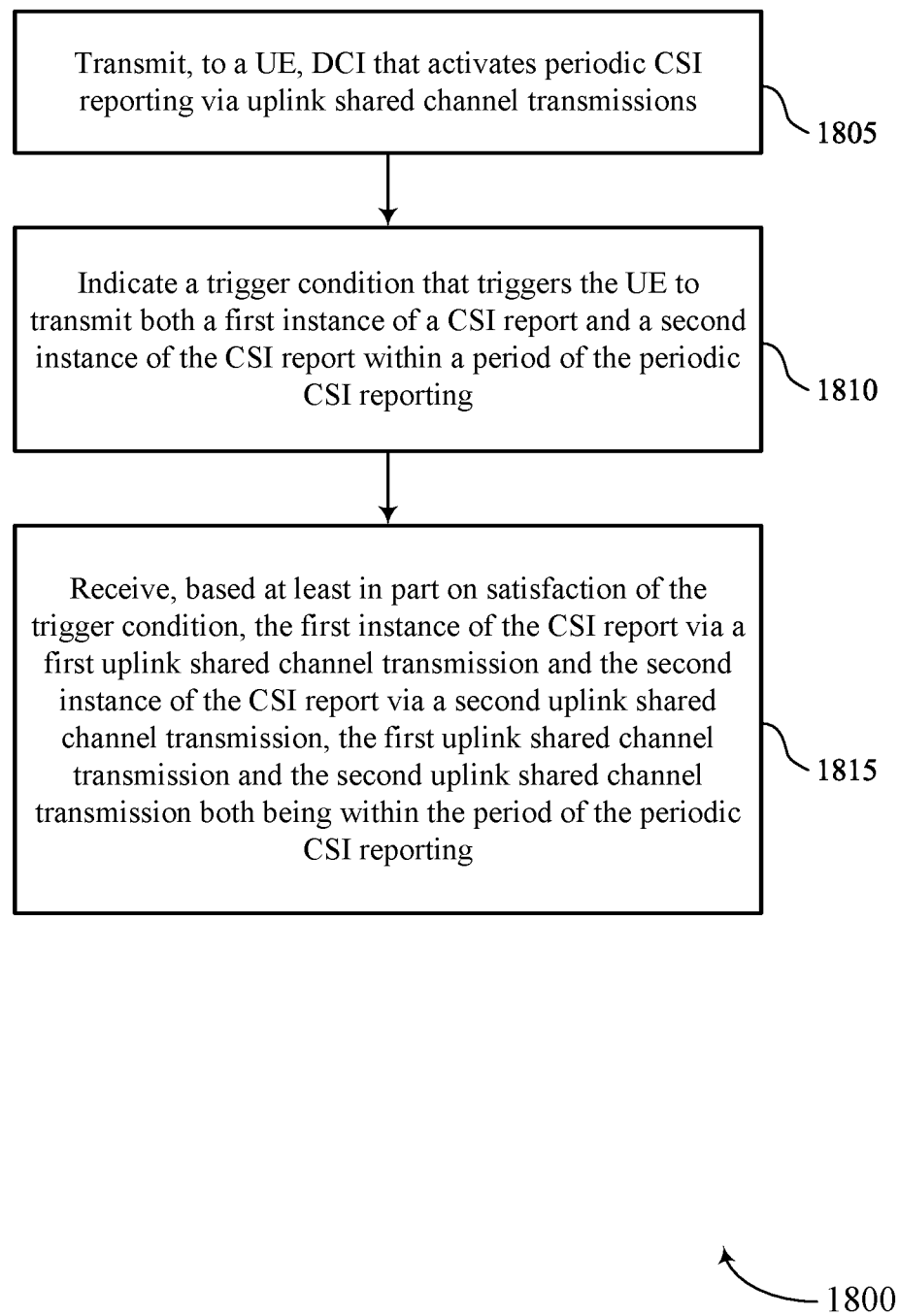

FIG. 18 shows a flowchart illustrating a method 1800 that supports semipersistent reporting of CSI in accordance with aspects of the present disclosure. The operations of the method 1800 may be implemented by a base station or its components as described herein. For example, the operations of the method 1800 may be performed by a base station 105 as described with reference to FIGS. 1 through 4 and 9 through 12. In some examples, a base station may execute a set of instructions to control the functional elements of the base station to perform the described functions. Additionally or alternatively, the base station may perform aspects of the described functions using special-purpose hardware.

At 1805, the method may include transmitting, to a UE, DCI that activates periodic CSI reporting via uplink shared channel transmissions. The operations of 1805 may be performed in accordance with examples as disclosed herein. In some examples, aspects of the operations of 1805 may be performed by a DCI transmitter 1125 as described with reference to FIG. 11.

At 1810, the method may include indicating a trigger condition that triggers the UE to transmit both a first instance of a CSI report and a second instance of the CSI report within a period of the periodic CSI reporting. The operations of 1810 may be performed in accordance with examples as disclosed herein. In some examples, aspects of the operations of 1810 may be performed by a trigger condition component 1130 as described with reference to FIG. 11.

At 1815, the method may include receiving, based on satisfaction of the trigger condition, the first instance of the CSI report via a first uplink shared channel transmission and the second instance of the CSI report via a second uplink shared channel transmission, the first uplink shared channel transmission and the second uplink shared channel transmission both being within the period of the periodic CSI reporting. The operations of 1815 may be performed in accordance with examples as disclosed herein. In some examples, aspects of the operations of 1815 may be performed by a CSI report receiver 1135 as described with reference to FIG. 11.

Figure 19:
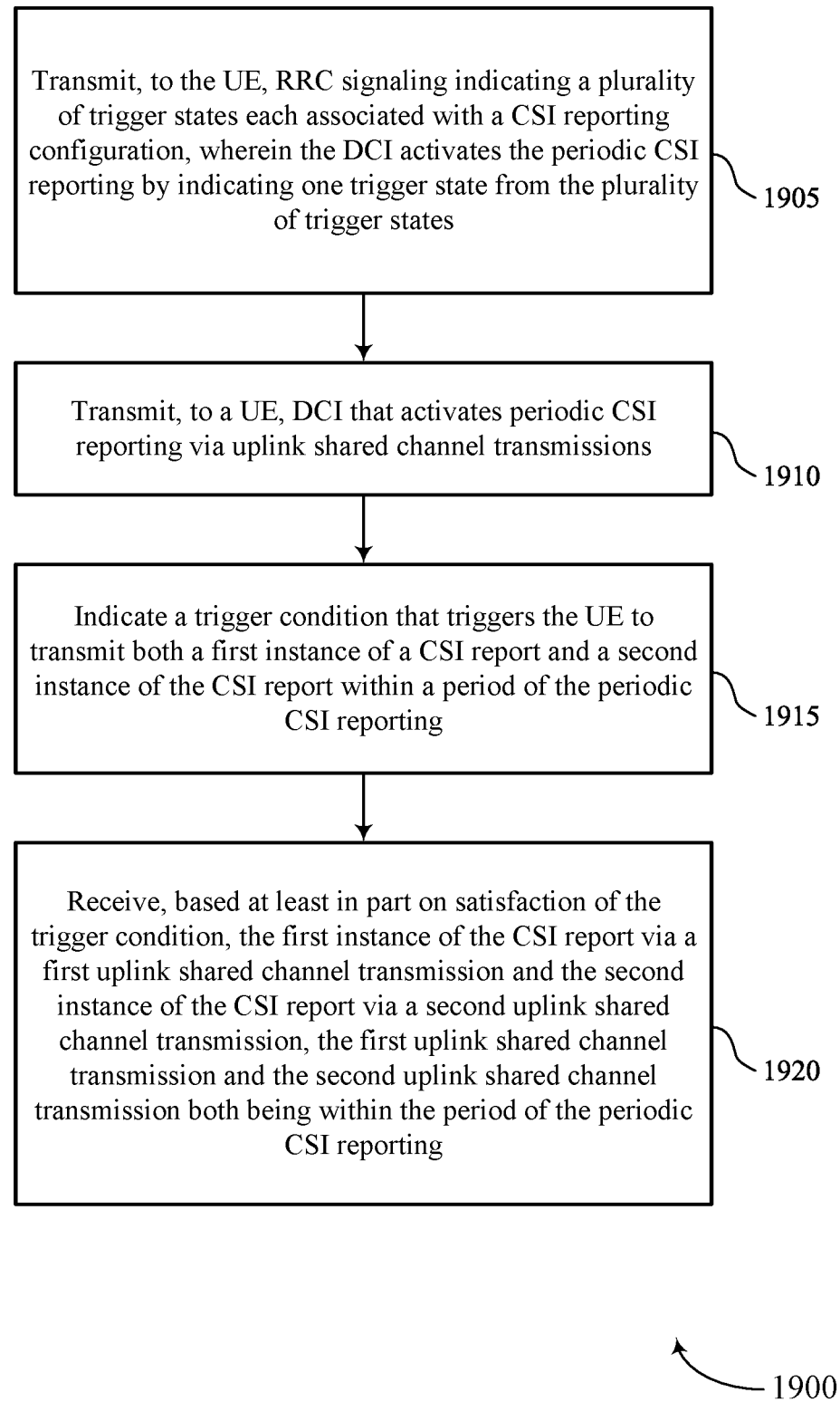

FIG. 19 shows a flowchart illustrating a method 1900 that supports semipersistent reporting of CSI in accordance with aspects of the present disclosure. The operations of the method 1900 may be implemented by a base station or its components as described herein. For example, the operations of the method 1900 may be performed by a base station 105 as described with reference to FIGS. 1 through 4 and 9 through 12. In some examples, a base station may execute a set of instructions to control the functional elements of the base station to perform the described functions. Additionally or alternatively, the base station may perform aspects of the described functions using special-purpose hardware.

At 1905, the method may include transmitting, to the UE, RRC signaling indicating a set of multiple trigger states each associated with a CSI reporting configuration, where the DCI activates the periodic CSI reporting by indicating one trigger state from the set of multiple trigger states. The operations of 1905 may be performed in accordance with examples as disclosed herein. In some examples, aspects of the operations of 1905 may be performed by an RRC signaling transmitter 1140 as described with reference to FIG. 11.

At 1910, the method may include transmitting, to a UE, DCI that activates periodic CSI reporting via uplink shared channel transmissions. The operations of 1910 may be performed in accordance with examples as disclosed herein. In some examples, aspects of the operations of 1910 may be performed by a DCI transmitter 1125 as described with reference to FIG. 11.

At 1915, the method may include indicating a trigger condition that triggers the UE to transmit both a first instance of a CSI report and a second instance of the CSI report within a period of the periodic CSI reporting. The operations of 1915 may be performed in accordance with examples as disclosed herein. In some examples, aspects of the operations of 1915 may be performed by a trigger condition component 1130 as described with reference to FIG. 11.

At 1920, the method may include receiving, based on satisfaction of the trigger condition, the first instance of the CSI report via a first uplink shared channel transmission and the second instance of the CSI report via a second uplink shared channel transmission, the first uplink shared channel transmission and the second uplink shared channel transmission both being within the period of the periodic CSI reporting. The operations of 1920 may be performed in accordance with examples as disclosed herein. In some examples, aspects of the operations of 1920 may be performed by a CSI report receiver 1135 as described with reference to FIG. 11.

Aspect 1: A method for wireless communication at a UE, comprising: receiving, from a base station, DCI that activates periodic CSI reporting via uplink shared channel transmissions; identifying a trigger condition that triggers transmission of both a first instance of a CSI report and a second instance of the CSI report within a period of the periodic CSI reporting; and transmitting, based at least in part on satisfaction of the trigger condition, the first instance of the CSI report via a first uplink shared channel transmission and the second instance of the CSI report via a second uplink shared channel transmission, the first uplink shared channel transmission and the second uplink shared channel transmission both being within the period of the periodic CSI reporting.

Aspect 2: The method of aspect 1, further comprising: determining that the trigger condition is satisfied based at least in part on the DCI indicating both a first SRS resource set associated with the first uplink shared channel transmission and a second SRS resource set associated with the second uplink shared channel transmission.

Aspect 3: The method of aspect 2, wherein the transmitting comprises: transmitting the first instance of the CSI report via the first uplink shared channel transmission using a first transmission beam associated with the first SRS resource set; and transmitting the second instance of the CSI report via the second uplink shared channel transmission using a second transmission beam associated with the second SRS resource set.

Aspect 4: The method of any of aspects 1 through 3, further comprising: determining that the trigger condition is satisfied based at least in part on the DCI indicating more than one repetition of uplink shared channel transmissions within the period of the periodic CSI reporting.

Aspect 5: The method of any of aspects 1 through 4, further comprising: receiving, from the base station, RRC signaling indicating a plurality of trigger states each associated with a CSI reporting configuration, wherein the DCI activates the periodic CSI reporting by indicating one trigger state from the plurality of trigger states.

Aspect 6: The method of aspect 5, further comprising: determining that the trigger condition is satisfied based at least in part on the one trigger state being associated with a CSI reporting configuration that indicates the transmission of both the first instance of the CSI report and the second instance of the CSI report within the period of the periodic CSI reporting.

Aspect 7: The method of any of aspects 1 through 6, further comprising: determining that the trigger condition is satisfied based at least in part on a value of a field within the DCI that is configured to indicate either the transmission of both the first instance of the CSI report and the second instance of the CSI report within the period of the periodic CSI reporting or a transmission of a single CSI report within the period of the periodic CSI reporting.

Aspect 8: The method of any of aspects 1 through 7, further comprising: determining to transmit two repetitions of a PUSCH transmission within each period of the periodic CSI reporting based at least in part on the satisfaction of the trigger condition, the two repetitions comprising the first uplink shared channel transmission and the second uplink shared channel transmission.

Aspect 9: The method of aspect 8, wherein a configured quantity of repetitions of the PUSCH transmission within each period of the periodic CSI reporting is one or greater than two.

Aspect 10: The method of any of aspects 1 through 9, further comprising: determining, after the period of the periodic CSI reporting, a second CSI report to transmit during a second period of the periodic CSI reporting via a third PUSCH transmission and a fourth PUSCH transmission; identifying that an actual transmission of one PUSCH transmission from the third PUSCH transmission or the fourth PUSCH transmission is different from a nominal transmission of the one PUSCH transmission; and refraining from transmitting the one PUSCH transmission during the second period of the periodic CSI reporting based at least in part on identifying that the actual transmission is different from the nominal transmission.

Aspect 11: The method of aspect 10, further comprising: transmitting, within the second period of the periodic CSI reporting, an other PUSCH transmission from the third PUSCH transmission and the fourth PUSCH transmission comprising the second CSI report based at least in part on an actual transmission of the other PUSCH transmission being the same as a nominal transmission of the other PUSCH transmission.

Aspect 12: The method of any of aspects 10 through 11, further comprising: refraining from transmitting an other PUSCH transmission from the third PUSCH transmission and the fourth PUSCH transmission based at least in part on an actual transmission of the other PUSCH transmission being the different from the nominal transmission of the other PUSCH transmission.

Aspect 13: The method of any of aspects 1 through 12, wherein the DCI activates the periodic CSI reporting based at least in part on indicating a trigger state associated with a CSI reporting configuration indicating a first transmission power and a second transmission power, wherein transmitting the first instance of the CSI report and the second instance of the CSI report is based at least in part on at least one of the first transmission power or the second transmission power.

Aspect 14: The method of aspect 13, wherein the transmitting comprises: transmitting, according to the first transmission power, the first instance of the CSI report via the first uplink shared channel transmission using a first SRS resource set indicated by the DCI; and transmitting, according to the second transmission power, the second instance of the CSI report via the second uplink shared channel transmission using a second SRS resource set indicated by the DCI.

Aspect 15: The method of any of aspects 13 through 14, wherein the transmitting comprises: transmitting both the first instance of the CSI report and the second instance of the CSI report according to the first transmission power based at least in part on the DCI indicating a single SRS resource set, wherein both the first uplink shared channel transmission and the second uplink shared channel transmission use the single SRS resource set.

Aspect 16: A method for wireless communication at a base station, comprising: transmitting, to a UE, DCI that activates periodic CSI reporting via uplink shared channel transmissions; indicating a trigger condition that triggers the UE to transmit both a first instance of a CSI report and a second instance of the CSI report within a period of the periodic CSI reporting; and receiving, based at least in part on satisfaction of the trigger condition, the first instance of the CSI report via a first uplink shared channel transmission and the second instance of the CSI report via a second uplink shared channel transmission, the first uplink shared channel transmission and the second uplink shared channel transmission both being within the period of the periodic CSI reporting.

Aspect 17: The method of aspect 16, wherein the trigger condition is satisfied based at least in part on the DCI indicating both a first SRS resource set associated with the first uplink shared channel transmission and a second SRS resource set associated with the second uplink shared channel transmission.

Aspect 18: The method of aspect 17, wherein the first instance of the CSI report received via the first uplink shared channel transmission is associated with a first transmission beam corresponding to the first SRS resource set; and the second instance of the CSI report received via the second uplink shared channel transmission is associated with a second transmission beam corresponding to the second SRS resource set.

Aspect 19: The method of any of aspects 16 through 18, wherein the trigger condition is satisfied based at least in part on the DCI indicating more than one repetition of uplink shared channel transmissions within the period of the periodic CSI reporting.

Aspect 20: The method of any of aspects 16 through 19, further comprising: transmitting, to the UE, RRC signaling indicating a plurality of trigger states each associated with a CSI reporting configuration, wherein the DCI activates the periodic CSI reporting by indicating one trigger state from the plurality of trigger states.

Aspect 21: The method of aspect 20, wherein the trigger condition is satisfied based at least in part on the one trigger state being associated with a CSI reporting configuration that indicates for the UE to transmit both the first instance of the CSI report and the second instance of the CSI report within the period of the periodic CSI reporting.

Aspect 22: The method of any of aspects 16 through 21, wherein the trigger condition is satisfied based at least in part on a value of a field within the DCI that is configured to indicate either for the UE to transmit both the first instance of the CSI report and the second instance of the CSI report within the period of the periodic CSI reporting or for the UE to transmit a single CSI report within the period of the periodic CSI reporting.

Aspect 23: The method of any of aspects 16 through 22, wherein the DCI activates the periodic CSI reporting based at least in part on indicating a trigger state associated with a CSI reporting configuration indicating a first transmission power and a second transmission power, wherein receiving the first instance of the CSI report and the second instance of the CSI report is based at least in part on at least one of the first transmission power or the second transmission power.

Aspect 24: The method of aspect 23, wherein the receiving comprises: receiving the first instance of the CSI report via the first uplink shared channel transmission having the first transmission power and associated with a first SRS resource set indicated by the DCI; and receiving the second instance of the CSI report via the second uplink shared channel transmission having the second transmission power and associated with a second SRS resource set indicated by the DCI.

Aspect 25: The method of any of aspects 23 through 24, wherein the receiving comprises: receiving both the first uplink shared channel transmission and the second uplink shared channel transmission using a single SRS resource set based at least in part on the DCI indicating the single SRS resource set, wherein both the first uplink shared channel transmission and the second uplink shared channel transmission have the first transmission power.

Aspect 26: An apparatus for wireless communication at a UE, comprising a processor; memory coupled with the processor; and instructions stored in the memory and executable by the processor to cause the apparatus to perform a method of any of aspects 1 through 15.

Aspect 27: An apparatus for wireless communication at a UE, comprising at least one means for performing a method of any of aspects 1 through 15.

Aspect 28: A non-transitory computer-readable medium storing code for wireless communication at a UE, the code comprising instructions executable by a processor to perform a method of any of aspects 1 through 15.

Aspect 29: An apparatus for wireless communication at a base station, comprising a processor; memory coupled with the processor; and instructions stored in the memory and executable by the processor to cause the apparatus to perform a method of any of aspects 16 through 25.

Aspect 30: An apparatus for wireless communication at a base station, comprising at least one means for performing a method of any of aspects 16 through 25.

Aspect 31: A non-transitory computer-readable medium storing code for wireless communication at a base station, the code comprising instructions executable by a processor to perform a method of any of aspects 16 through 25.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (e.g., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. A user equipment (UE), comprising:
one or more memories storing processor-executable code; and
one or more processors coupled with the one or more memories and individually or collectively operable to execute the code to cause the UE to:
receive downlink control information (DCI) that activates semipersistent channel state information (CSI) reporting via a physical uplink shared channel (PUSCH), the DCI indicating, based at least in part on a PUSCH repetition type for the semipersistent CSI reporting, a first sounding reference signal (SRS) resource set associated with a first nominal repetition or slot for a first PUSCH repetition and a second SRS resource set associated with a second nominal repetition or slot for a second PUSCH repetition;
transmit, based at least in part on the DCI, a CSI report via both the first PUSCH repetition and the second PUSCH repetition in accordance with the first SRS resource set associated with the first nominal repetition or slot for the first PUSCH repetition and the second SRS resource set associated with the second nominal repetition or slot for the second PUSCH repetition;
refrain from transmitting a first iteration of a second CSI report corresponding to a first nominal repetition of the second CSI report based at least in part on the first nominal repetition of the second CSI report being different from a first actual repetition of the second CSI report; and
transmit a second iteration of the second CSI report corresponding to a second nominal repetition of the second CSI report based at least in part on the second nominal repetition of the second CSI report being the same as a second actual repetition of the second CSI report.

2. The UE of claim 1, wherein the one or more processors are individually or collectively further operable to execute the code to cause the UE to:
receive an indication of a SemiPersistentOnPUSCH-TriggerStateLists parameter configuring a set of trigger states, wherein the DCI activates a trigger state of the set of trigger states based at least in part on the DCI being scrambled with a semipersistent-CSI-radio network temporary identifier (SP-CSI-RNTI), and the semipersistent CSI reporting is activated based at least in part on the DCI activating the trigger state.

3. The UE of claim 1, wherein the one or more processors are individually or collectively further operable to execute the code to cause the UE to:
receive an indication of a SemiPersistentOnPUSCH-TriggerStateLists parameter configuring a set of trigger states, wherein the DCI comprises a field activating a trigger state of the set of trigger states, and the semipersistent CSI reporting is activated based at least in part on the field activating the trigger state.

4. The UE of claim 3, wherein the field comprises a single bit activating the trigger state.

5. The UE of claim 1, wherein the one or more processors are individually or collectively further operable to execute the code to cause the UE to:
determine to transmit two PUSCH repetitions based at least in part on the first SRS resource set associated with the first nominal repetition or slot for the first PUSCH repetition and the second SRS resource set associated with the second nominal repetition or slot for the second PUSCH repetition, wherein the CSI report is transmitted via both the first PUSCH repetition and the second PUSCH repetition in accordance with determining to transmit the two PUSCH repetitions.

6. The UE of claim 5, wherein a configured quantity of PUSCH repetitions for the semipersistent CSI reporting is one or greater than two.

7. A network device, comprising:
one or more memories storing processor-executable code; and one or more processors coupled with the one or more memories and individually or collectively operable to execute the code to cause the network device to:

transmit downlink control information (DCI) that activates, for a user equipment (UE), semipersistent channel state information (CSI) reporting via a physical uplink shared channel (PUSCH), the DCI indicating, based at least in part on a PUSCH repetition type for the semipersistent CSI reporting, a first sounding reference signal (SRS) resource set associated with a first nominal repetition or slot for a first PUSCH repetition and a second SRS resource set associated with a second nominal repetition or slot for a second PUSCH repetition;

receive, based at least in part on the DCI, a CSI report for the UE via both the first PUSCH repetition and the second PUSCH repetition in accordance with the first SRS resource set associated with the first nominal repetition or slot for the first PUSCH repetition and the second SRS resource set associated with the second nominal repetition or slot for the second PUSCH repetition; and receive a second iteration of a second CSI report corresponding to a second nominal repetition of the second CSI report based at least in part on the second nominal repetition of the second CSI report being the same as a second actual repetition of the second CSI report.

8. The network device of claim 7, wherein the one or more processors are individually or collectively further operable to execute the code to cause the network device to:

transmit an indication of a SemiPersistentOnPUSCH-TriggerStateLists parameter configuring a set of trigger states, wherein the DCI activates a trigger state of the set of trigger states based at least in part on the DCI being scrambled with a semipersistent-CSI-radio network temporary identifier (SP-CSI-RNTI), and the semipersistent CSI reporting is activated based at least in part on the DCI activating the trigger state.

9. The network device of claim 7, wherein the one or more processors are individually or collectively further operable to execute the code to cause the network device to:

transmit an indication of a SemiPersistentOnPUSCH-TriggerStateLists parameter configuring a set of trigger states, wherein the DCI comprises a field activating a trigger state of the set of trigger states, and the semipersistent CSI reporting is activated based at least in part on the field activating the trigger state.

10. The network device of claim 9, wherein the field comprises a single bit activating the trigger state.

11. A method for wireless communications at a user equipment (UE), comprising:

receiving downlink control information (DCI) that activates semipersistent channel state information (CSI) reporting via a physical uplink shared channel (PUSCH), the DCI indicating, based at least in part on a PUSCH repetition type for the semipersistent CSI reporting, a first sounding reference signal (SRS) resource set associated with a first nominal repetition or slot for a first PUSCH repetition and a second SRS resource set associated with a second nominal repetition or slot for a second PUSCH repetition;

transmitting, based at least in part on the DCI, a CSI report via both the first PUSCH repetition and the second PUSCH repetition in accordance with the first SRS resource set associated with the first nominal repetition or slot for the first PUSCH repetition and the second SRS resource set associated with the second nominal repetition or slot for the second PUSCH repetition;

refraining from transmitting a first iteration of a second CSI report corresponding to a first nominal repetition of the second CSI report based at least in part on the first nominal repetition of the second CSI report being different from a first actual repetition of the second CSI report; and transmitting a second iteration of the second CSI report corresponding to a second nominal repetition of the second CSI report based at least in part on the second nominal repetition of the second CSI report being the same as a second actual repetition of the second CSI report.

12. The method of claim 11, further comprising:

receiving an indication of a SemiPersistentOnPUSCH-TriggerStateLists parameter configuring a set of trigger states, wherein the DCI activates a trigger state of the set of trigger states based at least in part on the DCI being scrambled with a semipersistent-CSI-radio network temporary identifier (SP-CSI-RNTI), and the semipersistent CSI reporting is activated based at least in part on the DCI activating the trigger state.

13. The method of claim 11, further comprising:

receiving an indication of a SemiPersistentOnPUSCH-TriggerStateLists parameter configuring a set of trigger states, wherein the DCI comprises a field activating a trigger state of the set of trigger states, and the semipersistent CSI reporting is activated based at least in part on the field activating the trigger state.

14. The method of claim 13, wherein the field comprises a single bit activating the trigger state.

15. The method of claim 11, further comprising:

determining to transmit two PUSCH repetitions based at least in part on the first SRS resource set associated with the first nominal repetition or slot for the first PUSCH repetition and the second SRS resource set associated with the second nominal repetition or slot for the second PUSCH repetition, wherein the CSI report is transmitted via both the first PUSCH repetition and the second PUSCH repetition in accordance with determining to transmit the two PUSCH repetitions.

16. The method of claim 15, wherein a configured quantity of PUSCH repetitions for the semipersistent CSI reporting is one or greater than two.

17. The network device of claim 7, wherein the one or more processors are individually or collectively further operable to execute the code to cause the network device to:

transmit an indication of a configured quantity of PUSCH repetitions for the semipersistent CSI reporting, wherein the CSI report for the UE is received via both the first PUSCH repetition and the second PUSCH repetition regardless of the configured quantity of PUSCH repetitions.

18. The network device of claim 17, wherein the configured quantity of PUSCH repetitions is one or greater than two.

\* \* \* \* \*